(12) United States Patent
Ujiie et al.

(10) Patent No.: US 9,066,235 B2
(45) Date of Patent: Jun. 23, 2015

(54) CONTROL SYSTEM AND SECURITY CONTROL METHOD

(75) Inventors: Yoshihiro Ujiie, Osaka (JP); Susumu Kobayashi, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 196 days.

(21) Appl. No.: 13/881,093

(22) PCT Filed: Mar. 9, 2012

(86) PCT No.: PCT/JP2012/001629
§ 371 (c)(1),
(2), (4) Date: Apr. 23, 2013

(87) PCT Pub. No.: WO2012/144125
PCT Pub. Date: Oct. 26, 2012

(65) Prior Publication Data
US 2013/0219487 A1    Aug. 22, 2013

(30) Foreign Application Priority Data

Apr. 18, 2011  (JP) ................................ 2011-092475

(51) Int. Cl.
*G06F 21/31* (2013.01)
*H04W 12/08* (2009.01)
*H04L 29/06* (2006.01)
(Continued)

(52) U.S. Cl.
CPC ............. *H04W 12/08* (2013.01); *H04L 63/107* (2013.01); *H04W 4/206* (2013.01); *H04W 84/005* (2013.01)

(58) Field of Classification Search
CPC ....................................................... G06F 21/31
USPC ............................................................ 726/16
See application file for complete search history.

(56) References Cited

U.S. PATENT DOCUMENTS

| 7,667,580 | B2 * | 2/2010 | Tauchi et al. ............ 340/426.11 |
| 7,844,377 | B2 * | 11/2010 | Oota et al. ...................... 701/49 |
| 2007/0038344 | A1 * | 2/2007 | Oota et al. ...................... 701/29 |

(Continued)

FOREIGN PATENT DOCUMENTS

| JP | 2006-060544 | 3/2006 |
| JP | 2007-323580 | 12/2007 |

(Continued)

OTHER PUBLICATIONS

International Search Report issued May 29, 2012 in corresponding International (PCT) Application No. PCT/JP2012/001629.

*Primary Examiner* — Kambiz Zand
*Assistant Examiner* — Thanh Le
(74) *Attorney, Agent, or Firm* — Wenderoth, Lind & Ponack, L.L.P.

(57) ABSTRACT

A moving state detecting section 202 determines a moving state of a share source terminal 100. A moving state detecting section 302 determines a moving state of a share destination terminal 110. An inter-terminal distance measuring section 304 detects the distance between the share source terminal 100 and the share destination terminal 110. A security process determining section 305 determines a terminal and a function on which to perform a security process, based on the moving state of each terminal and the distance between the terminals. A security process executing section 306 notifies the determined terminal to perform the security process on the determined function.

15 Claims, 26 Drawing Sheets

(51) Int. Cl.
*H04W 4/20* (2009.01)
*H04W 84/00* (2009.01)

(56) References Cited

U.S. PATENT DOCUMENTS

2007/0281666 A1 12/2007 Yoshida
2010/0322183 A1* 12/2010 Iwamatsu .................... 370/330

FOREIGN PATENT DOCUMENTS

| JP | 2008-109358 | 5/2008 |
| JP | 2010-213152 | 9/2010 |
| JP | 2011-028647 | 2/2011 |
| JP | 2011-049876 | 3/2011 |

* cited by examiner

FIG. 2
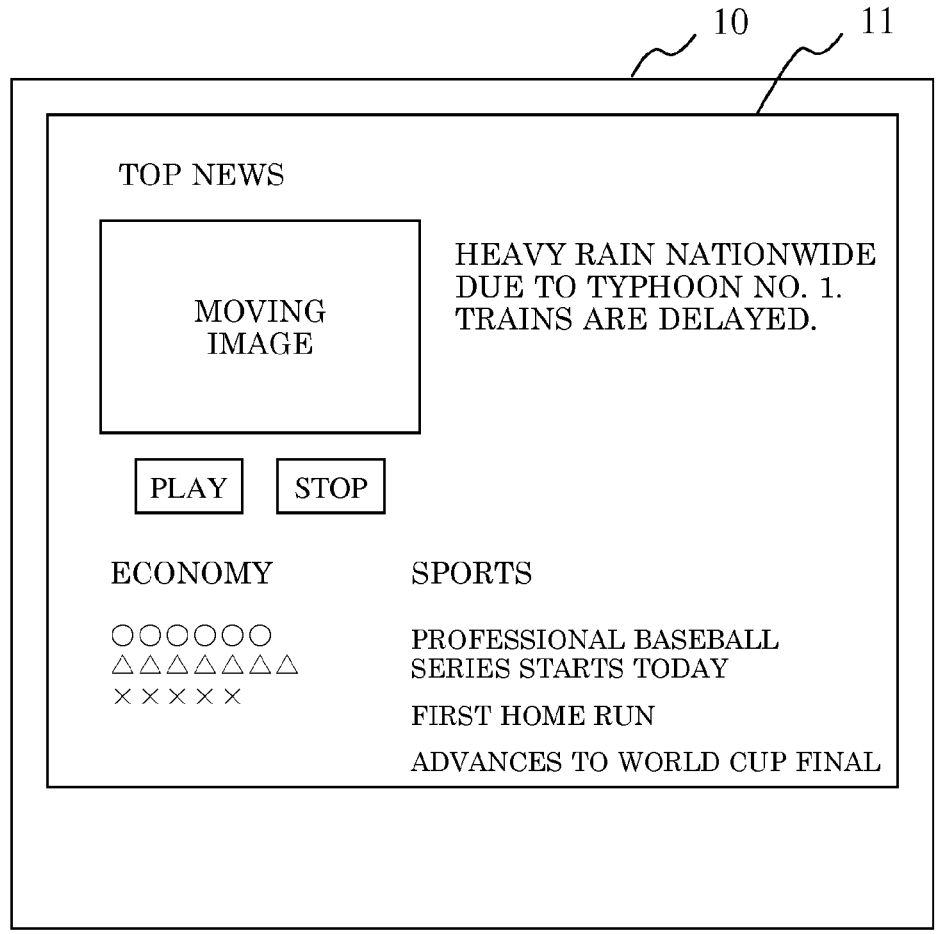
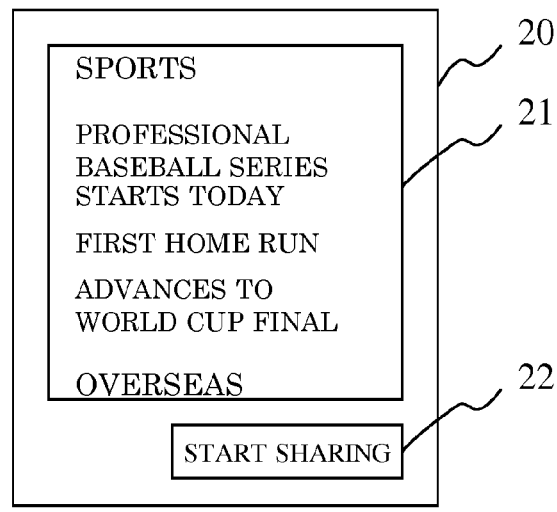

FIG. 5

| | MOVING TERMINAL INFORMATION | |
|---|---|---|
| TIME [ms] | THE NUMBER OF MOVING TERMINALS | MOVING TERMINAL TYPE |
| 30 | 0 | – |
| 60 | 0 | – |
| 90 | 1 | SHARE SOURCE TERMINAL |
| 120 | 2 | SHARE DESTINATION TERMINAL SHARE SOURCE TERMINAL |
| 150 | 1 | SHARE DESTINATION TERMINAL |
| 180 | 1 | SHARE DESTINATION TERMINAL |

FIG. 6

| INTER-TERMINAL DISTANCE INFORMATION | |
|---|---|
| TIME [ms] | INTER-TERMINAL DISTANCE [cm] |
| 30 | 30 |
| 60 | 30 |
| 90 | 180 |
| 120 | 280 |
| 150 | 550 |
| 180 | 800 |

FIG. 16

| OPERATION INFORMATION ||
|---|---|
| TIME [ms] | OPERATION |
| 30 | PERFORMED |
| 60 | NOT PERFORMED |
| 90 | NOT PERFORMED |
| 120 | NOT PERFORMED |
| 150 | NOT PERFORMED |
| 180 | NOT PERFORMED |

| SHARE DESTINATION TERMINAL | SHARE SOURCE TERMINAL | |
|---|---|---|
| | MOVING | NOT-MOVING |
| MOVING | · LOCK SHARE SOURCE TERMINAL<br>· LOCK SHARE DESTINATION TERMINAL | · LOCK SHARE DESTINATION TERMINAL |
| NOT-MOVING | · LOCK SHARE SOURCE TERMINAL | (NOT APPLICABLE) |

FIG. 25

| | | SHARE DESTINATION TERMINAL | | |
|---|---|---|---|---|
| | | MOVING | | NOT-MOVING |
| | | SPECIFIC USER | NON-SPECIFIC USER | |
| SHARE SOURCE TERMINAL | MOVING | SPECIFIC USER | • LOCK SHARE SOURCE TERMINAL<br>• LOCK SHARE DESTINATION TERMINAL | • LOCK SHARE DESTINATION TERMINAL | • LOCK SHARE DESTINATION TERMINAL |
| | | NON-SPECIFIC USER | • LOCK SHARE SOURCE TERMINAL | • LOCK SHARE SOURCE TERMINAL<br>• LOCK SHARE DESTINATION TERMINAL | • LOCK SHARE SOURCE TERMINAL |
| | NOT-MOVING | | • LOCK SHARE SOURCE TERMINAL | • LOCK SHARE SOURCE TERMINAL | (NOT APPLICABLE) |

FIG. 26

| | SHARE SOURCE TERMINAL | |
|---|---|---|
| SHARE DESTINATION TERMINAL | MOVING | NOT-MOVING |
| MOVING | · LOCK SHARE SOURCE TERMINAL<br>· TURN OFF COMMUNICATION FUNCTION OF SHARE SOURCE TERMINAL<br>· DELETE SHARED DATA FROM SHARE DESTINATION TERMINAL | · TURN OFF COMMUNICATION FUNCTION OF SHARE SOURCE TERMINAL<br>· DELETE SHARED DATA FROM SHARE DESTINATION TERMINAL |
| NOT-MOVING | · LOCK SHARE SOURCE TERMINAL | (NOT APPLICABLE) |

FIG. 27

| | | Share Source Terminal — Moving — Specific User | Share Source Terminal — Moving — Non-specific User | Share Source Terminal — Not-moving |
|---|---|---|---|---|
| Share Destination Terminal — Moving | Specific User | · Lock share source terminal<br>· Lock share destination terminal | · Lock share source terminal<br>· Turn off communication function of share source terminal<br>· Delete shared data from share destination terminal | · Lock share source terminal |
| Share Destination Terminal — Moving | Non-specific User | · Lock share destination terminal<br>· Turn off communication function of share source terminal<br>· Delete shared data from share destination terminal | · Turn off communication function of share source terminal<br>· Delete shared data from share destination terminal | · Turn off communication function of share source terminal<br>· Delete shared data from share destination terminal |
| Share Destination Terminal — Not-moving | | · Lock share destination terminal | · Turn off communication function of share source terminal<br>· Delete shared data from share destination terminal | (Not applicable) |

CONTROL SYSTEM AND SECURITY CONTROL METHOD

TECHNICAL FIELD

The present invention relates to a security control method for controlling, when a plurality of terminals share data therebetween, security functions of terminals in accordance with various states of the terminals, and relates to a control system which performs the method.

BACKGROUND ART

In recent years, more people own a plurality of information communication terminals that can execute applications, such as desktop personal computer (hereinafter, referred to as PC), notebook PC, tablet PC, PDA (personal digital assistant), mobile phone, smartphone, and the like, and use a plurality of information communication terminals differently in accordance with situations. Such information communication terminals are provided with functions to share necessary data when they are used in accordance with situations.

Data handled by smartphones often includes personal information. For example, there are many people who visit shopping sites by using browsers and input personal information such as address, credit card number, and the like. Access history and bookmark information made while a person uses a browser are privacy-related information, and thus, he or she may not want such information to be viewed by others. Thus, when data including such information is shared among information communication terminals, utmost attention need to be paid in order to prevent such information from leaking and being misused. Conceivable cases include a case where an information communication terminal not being used by its user is taken away by a third party while data is being shared, a case where information in the information communication terminal is viewed by a third party without permission, and the like.

In order to prevent above cases, a conventional technology has suggested a mobile communication terminal provided with means for performing, when the information communication terminal performs wireless communication with another information communication terminal, a predetermined security function, in accordance with a communication state of the wireless communication and the distance between the terminal itself and its communication partner terminal (for example, see Patent Literature 1).

CITATION LIST

Patent Literature

[PTL 1] Japanese Patent No. 4413709

SUMMARY OF THE INVENTION

Problems to be Solved by the Invention

However, a conventional configuration described in Patent Literature 1 above has the following problems.

The above mobile communication terminal performs a security function only in accordance with the communication state and the distance. Therefore, when communication is performed between terminals which share such highly-confidential data including personal information, flexible control based on features of each terminal that holds data or uses data cannot be performed.

Therefore, an object of the present invention is to provide a security control method that allows flexible control of, when a plurality of terminals are to share data, the security functions of the terminals in accordance with various states of the terminals, and a control system that performs the security control method.

Solution to the Problems

The present invention is directed to a control system formed by at least two wireless terminals that share data. In order to attain the above object, in the control system of the present invention, a share source terminal which provides shared data includes a first moving state detecting section configured to detect whether the share source terminal itself is in a moving state and to notify a share destination terminal of a result of the detection, and the share destination terminal which uses shared data provided by the share source terminal includes: a second moving state detecting section configured to detect whether the share destination terminal itself is in a moving state; a moving terminal determining section configured to determine a moving terminal that is currently moving, based on the result of the detection notified of by the first moving state detecting section and a result detected by the second moving state detecting section; a security process determining section configured to determine a terminal on which to perform a security process and a content of the security process, in accordance with a specific condition and the moving terminal determined by the moving terminal determining section; and a security process executing section configured to perform the security process determined by the security process determining section.

The share destination terminal may further include an inter-terminal distance measuring section configured to measure an inter-terminal distance between the share source terminal and the share destination terminal, or an operation detecting section configured to detect presence or absence of a terminal operation onto the share destination terminal itself performed by an operator, and the security process determining section may use the inter-terminal distance or the presence or absence of the terminal operation as the specific condition. In this case, if at least one of the share source terminal and the share destination terminal includes an operator detecting section configured to detect an operator operating the at least one terminal itself, the security process determining section can use whether the operator detected by the operator detecting section is a specific user, as the specific condition.

As a typical security process, it is conceivable to perform the following process in the case where the inter-terminal distance is not smaller than a predetermined value or in the case where a terminal operation is not performed for a certain time period. Examples of the security process include a process of locking a moving terminal, a process of locking a not-moving terminal if the operator of the moving terminal is a specific user and of locking the moving terminal if the operator of the moving terminal is not the specific user, a process of deleting shared data held by the share destination terminal and stopping a communication function of the share source terminal if the moving terminal is the share destination terminal and of locking the share source terminal if the moving terminal is the share source terminal, and a process of locking a not-moving terminal if the operator of the moving terminal is the specific user and of deleting shared data held by the share destination terminal and of stopping the communication function of the share source terminal if the operator of the moving terminal is not the specific user.

Advantageous Effects of the Invention

According to the control system of the present invention, when a plurality of terminals are to share data, the security functions of the terminals can be flexibly controlled in accordance with various states of the respective terminals. Therefore, an illegal access by a third party can be prevented.

BRIEF DESCRIPTION OF THE DRAWINGS

FIG. 2 shows an example of a display screen 11 of a tablet PC 10 and a display screen 21 of a mobile phone 20.

FIG. 5 shows an example of moving terminal information generated by a moving terminal determining section 303.

FIG. 6 shows an example of inter-terminal distance information generated by an inter-terminal distance measuring section 304.

FIG. 16 shows an example of operation information detected by a touch sensor 1514.

FIG. 24 shows a list of security processes performed by the control system according to the first and the fifth embodiments.

FIG. 25 shows a list of security processes performed by the control system according to the second and sixth embodiments.

FIG. 26 shows a list of security processes performed by the control system according to the third and seventh embodiments.

FIG. 27 shows a list of security processes performed by the control system according to the fourth and eighth embodiments.

DESCRIPTION OF EMBODIMENTS

Hereinafter, embodiments of the present invention will be described with reference to the drawings.

The present invention assumes a situation where, when a user switches an information communication terminal being used by the user, from a first terminal (hereinafter, referred to as share source terminal) to a second terminal (hereinafter referred to as share destination terminal), the user is going to continuously use the application having been used in the share source terminal, also in the share destination terminal. In such a situation, information (shared data) such as operation contents performed onto the application in the share source terminal is transmitted to the share destination terminal. As a result, the same information is shared by the two terminals. Accordingly, the operation contents and the like of the application that the user had been using in the share source terminal before the terminal was switched is reproduced and displayed on the screen of the share destination terminal.

The present invention is characterized in that, during this terminal switching process, a target terminal on which to perform a security process is switched, in accordance with the distance between the involved terminals, and information regarding operation states, moving states, and operators of the respective terminals.

Figure 1:
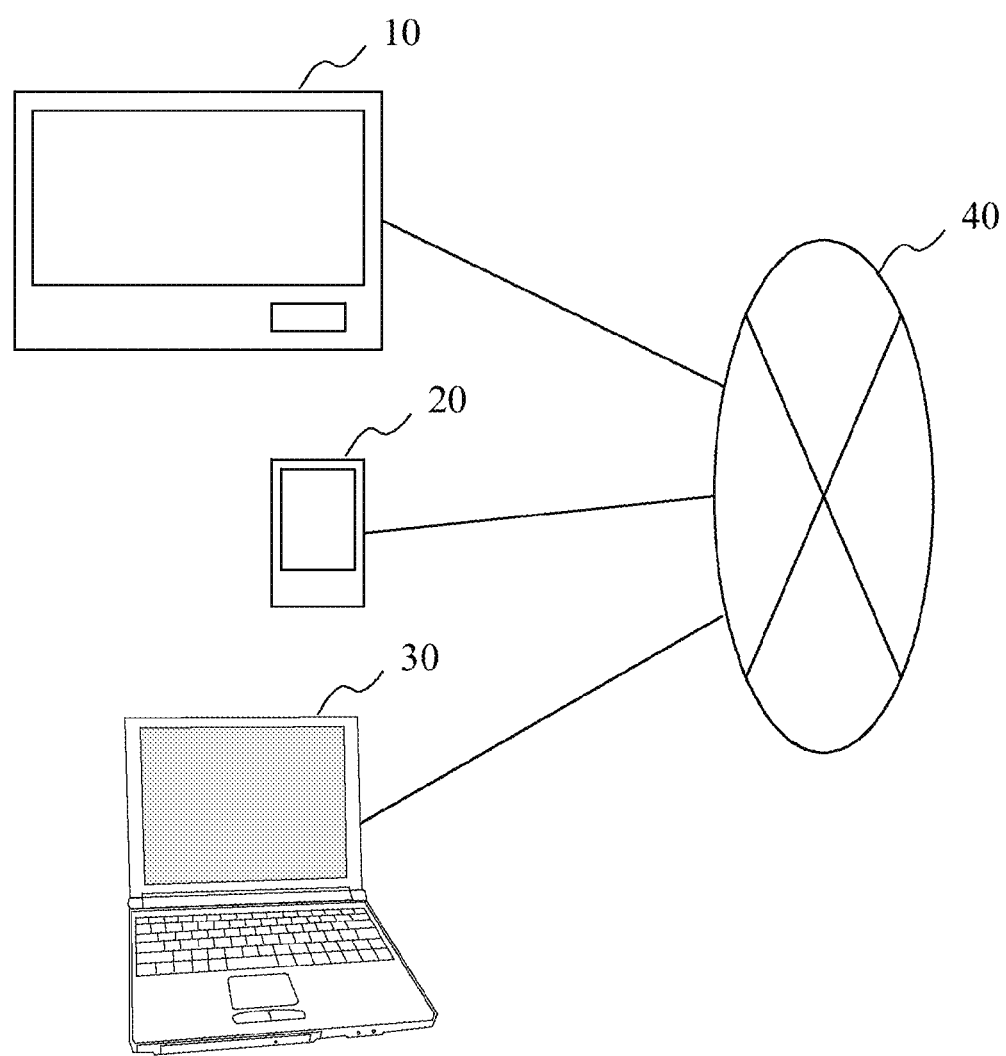
FIG. 1 shows an example of a configuration of a communication system including an information communication terminal provided by the present invention.

FIG. 1 shows an example of a configuration of a communication system including an information communication terminal provided by the present invention. In the example of FIG. 1, one user owns a plurality of information communication terminals, that is, a tablet PC 10, a mobile phone 20, and a notebook PC 30, which are connectable to a network 40. The user uses these information communication terminals differently in accordance with situations. For example, it is conceivable that when the user has come home while operating the mobile phone 20, the user switches the information communication terminal from the mobile phone 20 to the tablet PC 10 or the notebook PC 30 to continue the operation on a larger screen.

An example of display screens of the tablet PC 10 and the mobile phone 20 when internet news is being viewed is shown in FIG. 2. FIG. 2 shows an example of a display screen 11 of the tablet PC 10 and a display screen 21 of the mobile phone 20.

The tablet PC 10 and the mobile phone 20 of the present embodiment are each provided with a communication function for connecting to a network, and a part of a Web site obtained by the communication function is being displayed on each of the display screens 11 and 21. It should be noted that switching from the mobile phone 20 to the tablet PC 10 may be performed in accordance with an instruction through a physical button 22 or a software key provided in the mobile phone 20 being a share source terminal, or may be automatically performed by detecting a predetermined status change.

With respect to the usage described above, the switching direction may be in the reverse, of course. That is, each of the information communication terminals such as the tablet PC 10, the mobile phone 20, and the notebook PC 30 can be either of a share source terminal which provides shared data or a share destination terminal which uses the shared data.

Therefore, in each embodiment of the present invention below, the type of each information communication terminal is not questioned, and configurations necessary for an information communication terminal to function as a share source terminal, configurations necessary for an information communication terminal to function as a share destination terminal, and processes performed between the share source terminal and the share destination terminal will be described in detail.

First Embodiment

Figure 3:
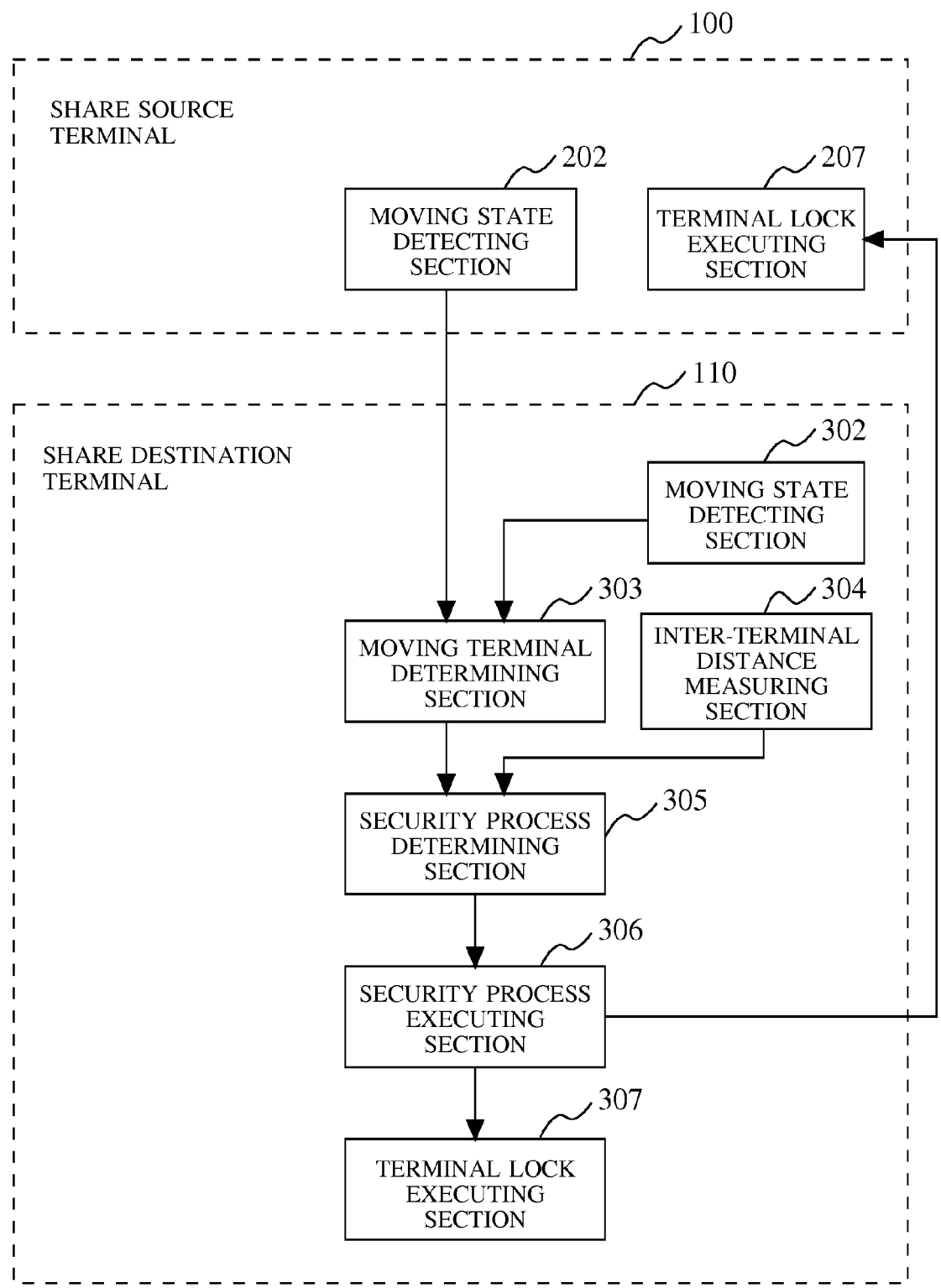
FIG. 3 shows internal configuration of a share source terminal 100 and a share destination terminal 110 forming a control system according to a first embodiment of the present invention.

FIG. 3 shows internal configurations of a share source terminal 100 and a share destination terminal 110 forming a control system according to a first embodiment of the present invention. The share source terminal 100 includes a moving state detecting section 202 and a terminal lock executing section 207. The share destination terminal 110 includes a moving state detecting section 302, a moving terminal determining section 303, an inter-terminal distance measuring section 304, a security process determining section 305, a security process executing section 306, and a terminal lock executing section 307.

The moving state detecting section 202 determines whether the share source terminal 100 which includes the moving state detecting section 202 is currently in a state of moving, and notifies the moving terminal determining section 303 included in the share destination terminal 110, of the determined result as movement information A, via a communication interface (not shown). As means for detecting the movement information, various well-known technologies such as technologies for estimating a movement amount using an acceleration sensor, and detection technologies using GPS (Global Positioning System) can be used. Further, for notification of movement information, various well-known technologies such as wireless communication through a wireless LAN, Bluetooth (registered trademark), ZigBee/IEEE 802.15.4, and the like, and wired communication through a wired LAN and the like can be used.

Figure 4A:
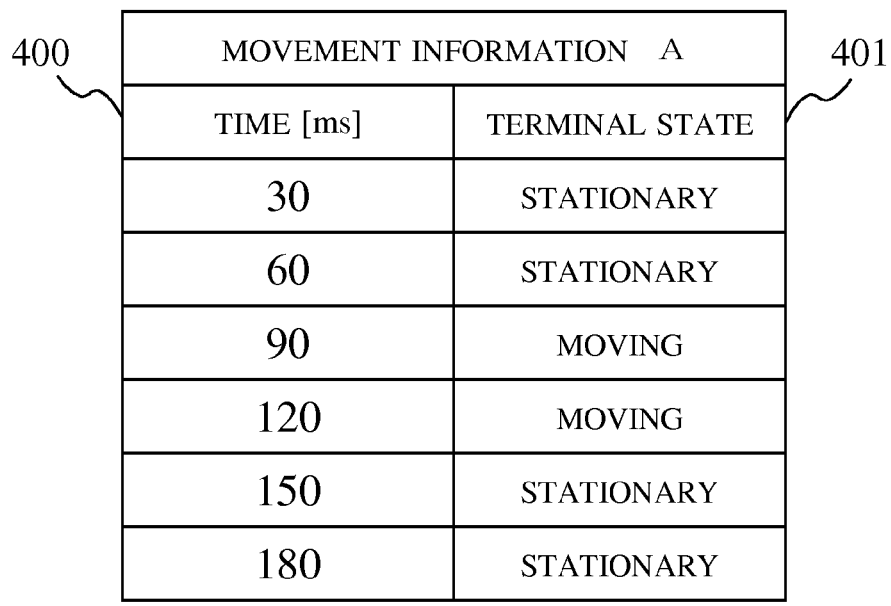
FIG. 4A shows an example of movement information A which is a detection result by a moving state detecting section 202.

FIG. 4A shows an example of the movement information A which is a detection result by the moving state detecting section 202. The movement information A is composed of time 400 and terminal state 401. The time 400 is information indicating time at which the moving state detecting section 202 periodically detects the terminal state 401. The terminal state 401 is information indicating whether the share source terminal 100 is in a moving state or in a stationary state. The movement information A illustrated in FIG. 4A shows that at times 30 ms, 60 ms, 90 ms, 120 ms, 150 ms, and 180 ms, the share source terminal 100 was stationary, stationary, moving, moving, stationary, and stationary, respectively. Every time the moving state of the terminal is determined at the latest detection time, the moving terminal determining section 303 is notified of the movement information A comprising a set of the time 400 of that time point and its corresponding terminal state 401.

The terminal lock executing section 207 performs a process of locking the share source terminal 100, based on a notification received via a communication interface (not shown) from the security process executing section 306 included in the share destination terminal 110. Locking the terminal here is an example of security processes applied to the present invention, and other security processes may be applied to the present invention.

The moving state detecting section 302 detects a moving state of the share destination terminal 110 which includes the moving state detecting section 302, and notifies the moving terminal determining section 303 of the detection result, as movement information B. Also as means for detecting the movement information used in the moving state detecting section 302, various well-known technologies can be used as in the case of the moving state detecting section 202.

Figure 4B:
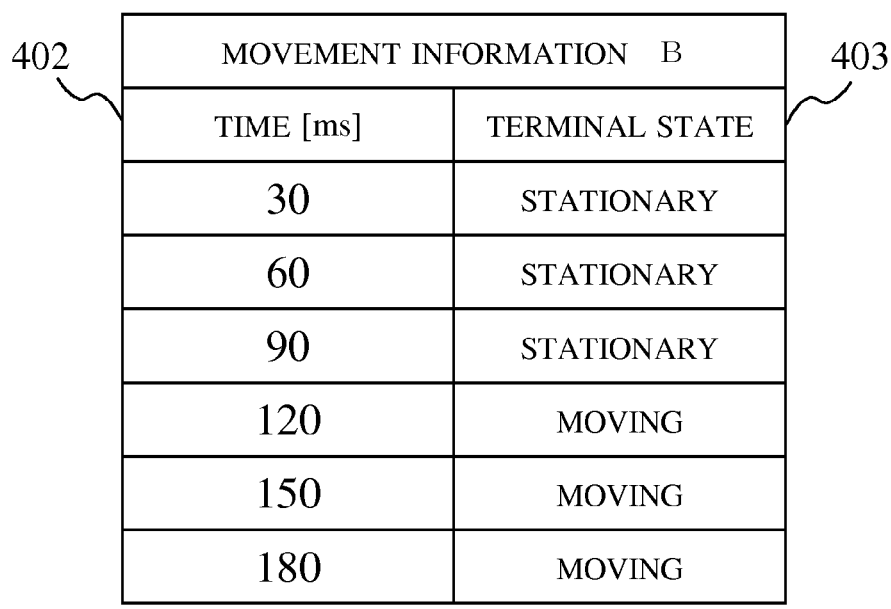
FIG. 4B shows an example of movement information B which is a detection result by a moving state detecting section 302.

FIG. 4B shows an example of the movement information B which is a determination result by the moving state detecting section 302. The movement information B is composed of time 402 and terminal state 403. The time 402 is information indicating time at which the moving state detecting section 302 periodically detects the terminal state 403, and is synchronized with the time 400 of the movement information A. The terminal state 403 is information indicating whether the share destination terminal 110 is in a moving state or a stationary state. The movement information B illustrated in FIG. 4B shows that at times 30 ms, 60 ms, 90 ms, 120 ms, 150 ms and 180 ms, the share destination terminal 110 was stationary, stationary, stationary, moving, moving, and moving, respectively. Every time the moving state of the terminal is determined in the latest detection time, the moving terminal determining section 303 is notified of the movement information B comprising a set of the time 402 of that time point and its corresponding terminal state 403.

The moving terminal determining section 303 determines a moving terminal, based on the movement information A notified of via a communication interface by the moving state detecting section 202 and the movement information B notified of by the moving state detecting section 302, generates information (hereinafter, referred to as moving terminal information) regarding the determined moving terminal, and notifies the security process determining section 305 of the generated information.

FIG. 5 shows an example of the moving terminal information generated by the moving terminal determining section 303. This moving terminal information is composed of time 500, the number of moving terminals 502, and moving terminal type 503. The time 500 is information indicating time at which the moving terminal determining section 303 determined the number of moving terminals 502 and the moving terminal type 503, and corresponds to the time 400 of the movement information A and the time 402 of the movement information B. The number of moving terminals 502 is information indicating the number of moving terminals. The moving terminal type 503 is information showing which of the share source terminal 100 and the share destination terminal 110 each moving terminal is. The moving terminal type 503 is recorded by the number corresponding to the value indicated by the number of moving terminals 502. The moving terminal information illustrated in FIG. 5 shows that at times 30 ms, 60 ms, 90 ms, 120 ms, 150 ms, and 180 ms, the number of moving terminals was 0, 0, 1, 2, 1, and 1, respectively, and that the types of the moving terminals at those times were no moving terminal, no moving terminal, share source terminal only, share source terminal and share destination terminal, share destination terminal only, and share destination terminal only, respectively. It should be noted that a specific determination method for determining a moving terminal will be described later with reference to FIG. 7.

The inter-terminal distance measuring section 304 measures the distance between the share source terminal 100 and the share destination terminal 110, generates information (hereinafter, referred to as inter-terminal distance information) regarding the measured inter-terminal distance, and notifies the security process determining section 305 of the generated information. As means for detecting the distance between terminals, various well-known technologies, such as technology for estimating an inter-terminal distance using a camera and detection technologies using GPS, can be used.

FIG. 6 shows an example of inter-terminal distance information generated by the inter-terminal distance measuring section 304. The inter-terminal distance information is composed of time 700 and inter-terminal distance 701. The time 700 is information indicating time at which the inter-terminal distance measuring section 304 periodically measures the inter-terminal distance 701, and is synchronized with the time 400 of the movement information A and the time 402 of the movement information B. The inter-terminal distance 701 is information indicating a physical distance between the share source terminal 100 and the share destination terminal 110, measured by the inter-terminal distance measuring section 304. The inter-terminal distance information illustrated in FIG. 6 shows that at times 30 ms, 60 ms, 90 ms, 120 ms, 150 ms, and 180 ms, the distance between the terminals was 30 cm, 30 cm, 180 cm, 280 cm, 550 cm, and 800 cm, respectively. Every time the distance between the terminals is determined in the latest detection time, the security process determining section 305 is notified of the inter-terminal distance information comprising a set of the time 700 of that time point and its corresponding inter-terminal distance 701.

The security process determining section 305 determines a terminal on which to perform a security process, based on the moving terminal information notified of by the moving terminal determining section 303 and the inter-terminal distance information notified of by the inter-terminal distance measuring section 304. The security process performed in the first embodiment is locking a terminal. The security process determining section 305 notifies the security process executing section 306 of the terminal on which the security process determining section 305 has determined to perform the security process. A specific terminal determination method will be described later with reference to FIG. 8.

When the security process executing section 306 is notified of information regarding the terminal on which to perform the security process, by the security process determining section 305, the security process executing section 306 notifies this terminal to perform the security process. For example, when the terminal on which to perform the security process is the share destination terminal 110, the security process executing section 306 notifies the terminal lock executing section 307 to that effect, and when the terminal on which to perform the security process is the share source terminal 100, the security process executing section 306 notifies the terminal lock executing section 207 to that effect via a communication interface. For performing notification to the terminal lock executing section 207, various well-known technologies can be used as in the case of the moving state detecting section 202 described above.

The terminal lock executing section 307 performs a process of locking the share destination terminal 110 based on the notification from the security process executing section 306. Locking the terminal here is also an example of security processes applied to the present invention, as mentioned regarding the terminal lock executing section 207, and thus, another security process may be performed.

Next, with reference to FIG. 7, the process of determining a moving terminal performed by the moving terminal determining section 303 will be described.

Figure 7:
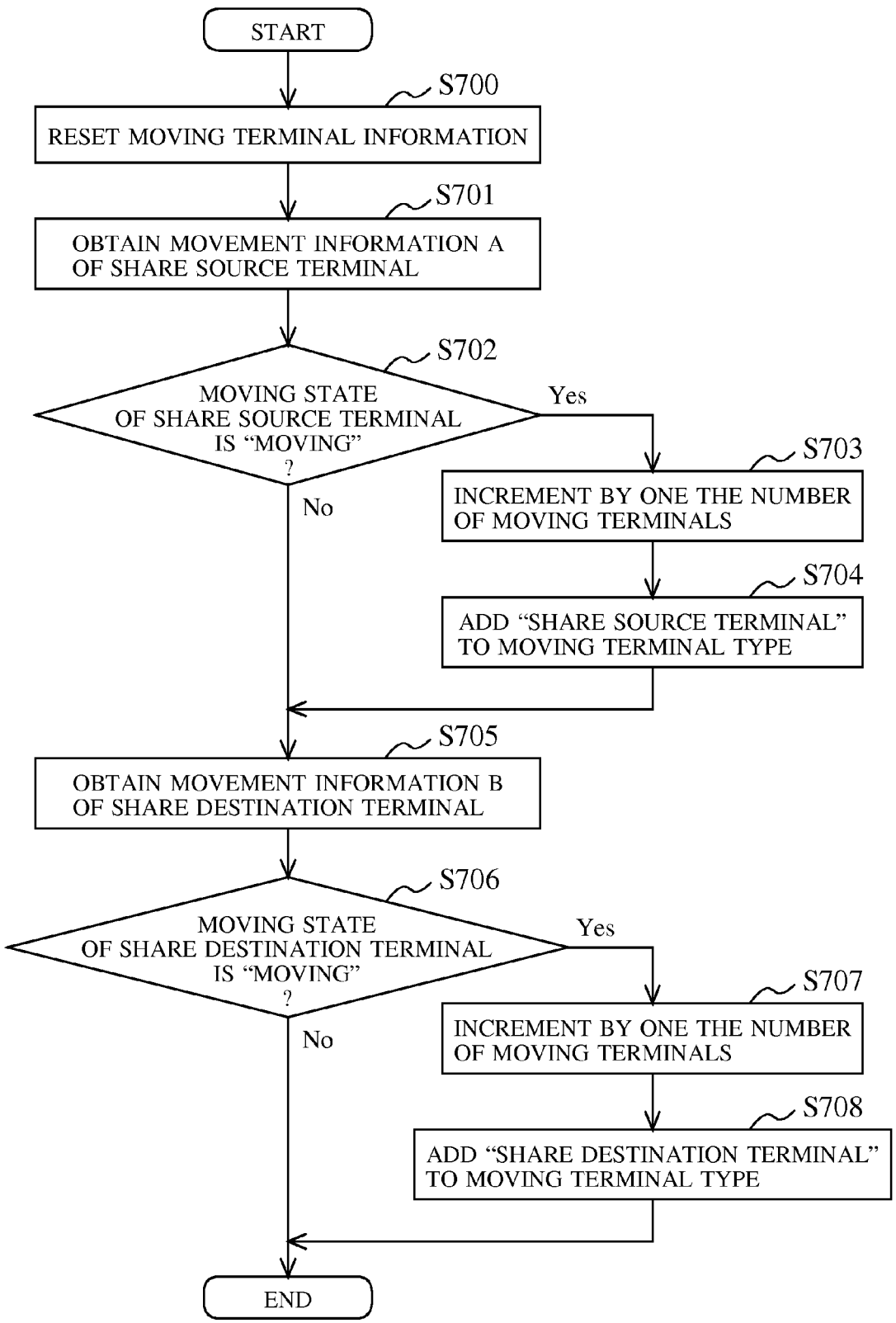
FIG. 7 is a flow chart showing an example of a process performed by the moving terminal determining section 303.

FIG. 7 is a flow chart showing an example of a moving terminal determining process performed by the moving terminal determining section 303 of the share destination terminal 110 according to the first embodiment of the present invention.

In the moving terminal determining process, the moving terminal determining section 303 first resets the moving terminal information (step S700). Next, the moving terminal determining section 303 obtains the latest movement information A from the moving state detecting section 202 (step S701), and confirms the terminal state 401 (step S702). Then, when the terminal state 401 is "moving" (step S702, Yes), the moving terminal determining section 303 increments by one the number of moving terminals 502 of the moving terminal information (step S703), and adds "share source terminal" to the moving terminal type 503 (step S704). On the other hand, when the terminal state 401 is "stationary" (step S702, No), the moving terminal determining section 303 does not perform any process.

When having completed the process regarding the movement information A, the moving terminal determining section 303 obtains, from the moving state detecting section 302, the movement information B of the time 402 having the same value as that of the time 400 of the movement information A obtained in step S701 (step S705), and confirms the terminal state 403 (step S706). Then, when the terminal state 403 is "moving" (step S706, Yes), the moving terminal determining section 303 increments by one the number of moving terminals 502 of the moving terminal information (step S707), and adds "share destination terminal" to the moving terminal type 503 (step S708). On the other hand, when the terminal state 403 is "stationary" (step S706, No), the moving terminal determining section 303 does not perform any process.

Through the above moving terminal determining process, the moving terminal information shown in FIG. 5 is generated.

Next, with reference to FIG. 8, the process, performed by the security process determining section 305, of determining a terminal whose function should be restricted will be described.

Figure 8:
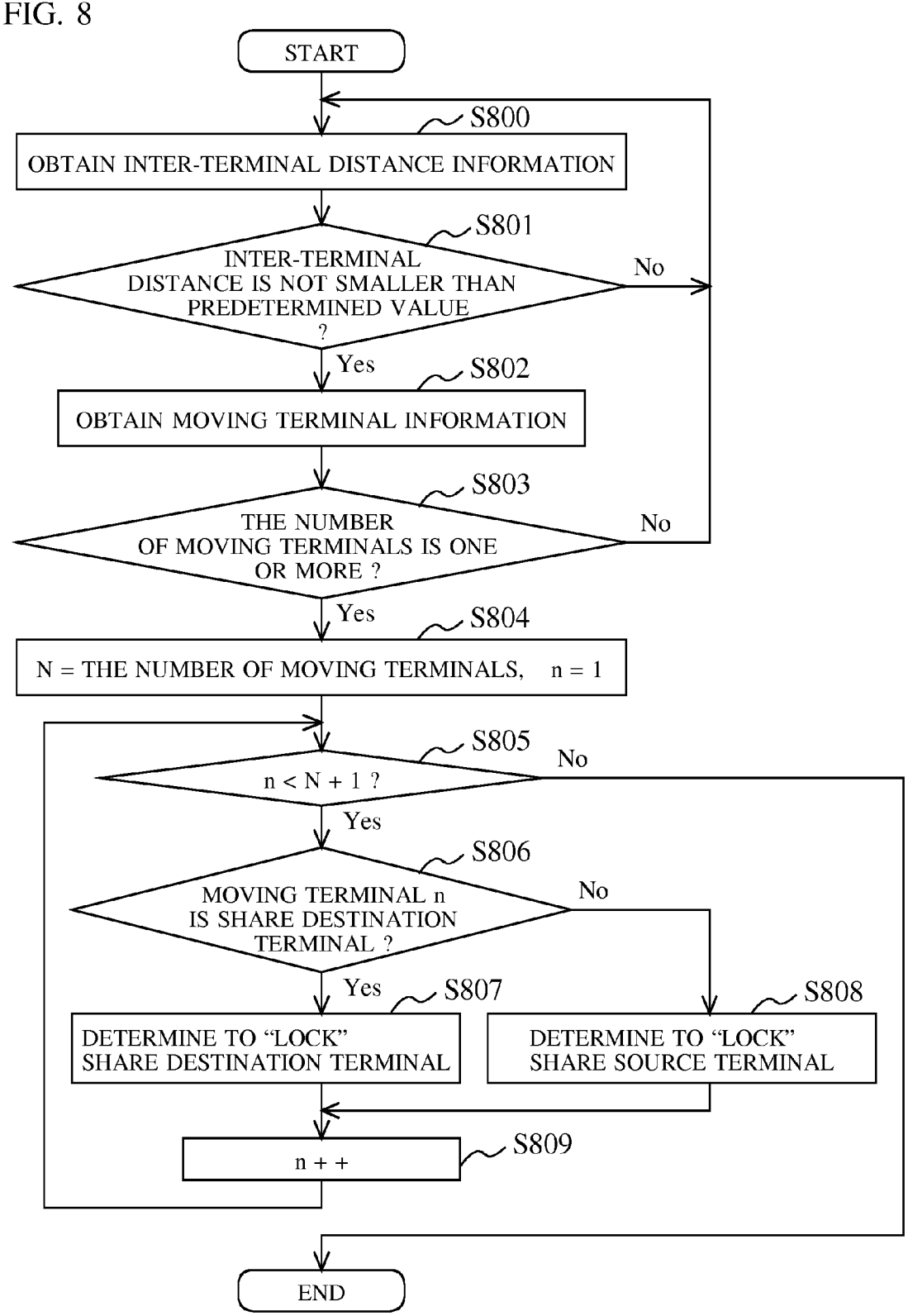
FIG. 8 is a flow chart showing an example of a process performed by a security process determining section 305.

FIG. 8 is a flow chart showing an example of the process, performed by the security process determining section 305, of determining a terminal on which to perform a security process according to the first embodiment of the present invention.

In the process of determining a terminal on which to perform the security process, the security process determining section 305 first obtains the latest inter-terminal distance information from the inter-terminal distance measuring section 304 (step S800), and determines whether the inter-terminal distance 701 is not smaller than a predetermined value (e.g., 300 cm) (step S801). When the inter-terminal distance 701 is not smaller than the predetermined value (step S801, Yes), the security process determining section 305 then obtains, from the moving terminal determining section 303, the moving terminal information corresponding to the time 500 having the same value as that of the time 700 of the inter-terminal distance information obtained in step S800 (step S802), and confirms the number of moving terminals 502 (step S803). As a result of this confirmation, when the number of moving terminals 502 is one or more (step S803, Yes), the security process determining section 305 determines security processes to be performed for the one or more moving terminals, in the following manner.

As an initial setting, defining the number of moving terminals 502 as N and the nth terminal included in the moving terminal type 503 as a moving terminal n, the security process determining section 305 sets the initial value n to 1 (step S804). With respect to each moving terminal n determined as existing in step S803, the security process determining section 305 confirms the terminal type (step S806). Then, when the moving terminal n is the share destination terminal 110 (step S806, Yes), the security process determining section 305 determines to lock the share destination terminal 110 irrespective of whether it is moving or not (step S807), and when the moving terminal n is the share source terminal 100 (step S806, No), the security process determining section 305 determines to lock the share source terminal 100 irrespective of whether it is moving or not (step S808). It should be noted that the process for all the moving terminals listed in the moving terminal type 503 is performed by repeating the determination whether n<N+1 (step S805), and increment of n by one (step S809). A list of security processes performed by the control system according to the first embodiment is shown in FIG. 24.

As described above, in the control system according to the first embodiment of the present invention, when data is shared among a plurality of information communication terminals, execution of a security function (locking a terminal) can be flexibly controlled in accordance with the moving state of each terminal.

Second Embodiment

Figure 9:
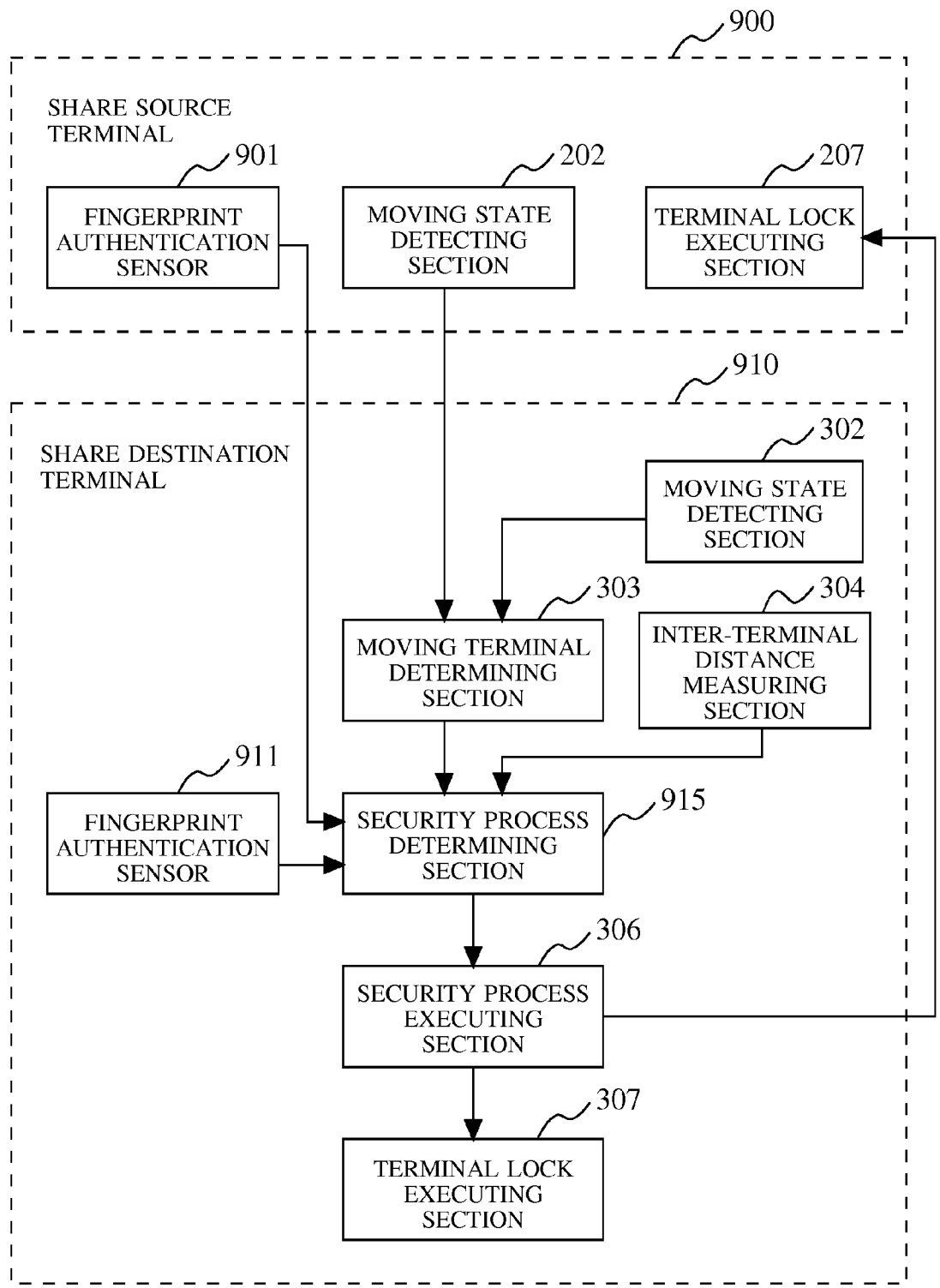
FIG. 9 shows internal configurations of a share source terminal 900 and a share destination terminal 910 forming a control system according to a second embodiment of the present invention.

FIG. 9 shows internal configurations of a share source terminal 900 and a share destination terminal 910 forming a control system according to a second embodiment of the present invention. The share source terminal 900 includes the moving state detecting section 202, the terminal lock executing section 207, and a fingerprint authentication sensor 901. The share destination terminal 910 includes the moving state detecting section 302, the moving terminal determining section 303, the inter-terminal distance measuring section 304, a security process determining section 915, the security process executing section 306, the terminal lock executing section 307, and a fingerprint authentication sensor 911.

The control system according to the second embodiment shown in FIG. 9 is different from that according to the first embodiment, in the configurations of the fingerprint authentication sensor 901 included in the share source terminal 900, and the fingerprint authentication sensor 911 and the security process determining section 915 included in the share destination terminal 910. Since the other configurations in the control system according to the second embodiment are the same as those of the first embodiment, they are denoted by the same reference characters, and description thereof will be omitted. Now, the fingerprint authentication sensor 901, the fingerprint authentication sensor 911, and the security process determining section 915 will be described.

The fingerprint authentication sensor 901 determines the operator operating the share source terminal 900 which includes the fingerprint authentication sensor 901, by his or her fingerprint, and notifies the security process determining section 915 included in the share destination terminal 910 via a communication interface (not shown), of this determined result as operator information A. Further, the fingerprint authentication sensor 911 determines the operator operating the share destination terminal 910 which includes the fingerprint authentication sensor 911, by his or her fingerprint, and notifies the security process determining section 915 of the determined result as operator information B. Each of the fingerprint authentication sensors 901 and 911 determines whether the detected operator's fingerprint is the fingerprint of a specific user set in advance, outputs operator information indicating whether the operator is the specific user or a user other than the specific user. It should be noted that the fingerprint authentication sensors 901 and 911 are an example of a configuration (operator detecting section) for detecting an operator to be applied to the present invention, and various well-known technologies other than this example can be used.

The security process determining section 915 determines a terminal on which to perform a security process, based on the operator information A notified of by the fingerprint authentication sensor 901, the operator information B notified of by the fingerprint authentication sensor 911, the moving terminal information notified of by the moving terminal determining section 303, and the inter-terminal distance information notified of by the inter-terminal distance measuring section 304. The security process performed in the second embodiment is locking a terminal. The security process determining section 915 notifies the security process executing section 306 of the terminal on which the security process determining section 915 has determined to perform the security process.

Next, with reference to FIG. 10, the process, performed by the security process determining section 915, of determining a terminal whose function should be restricted will be described.

Figure 10:
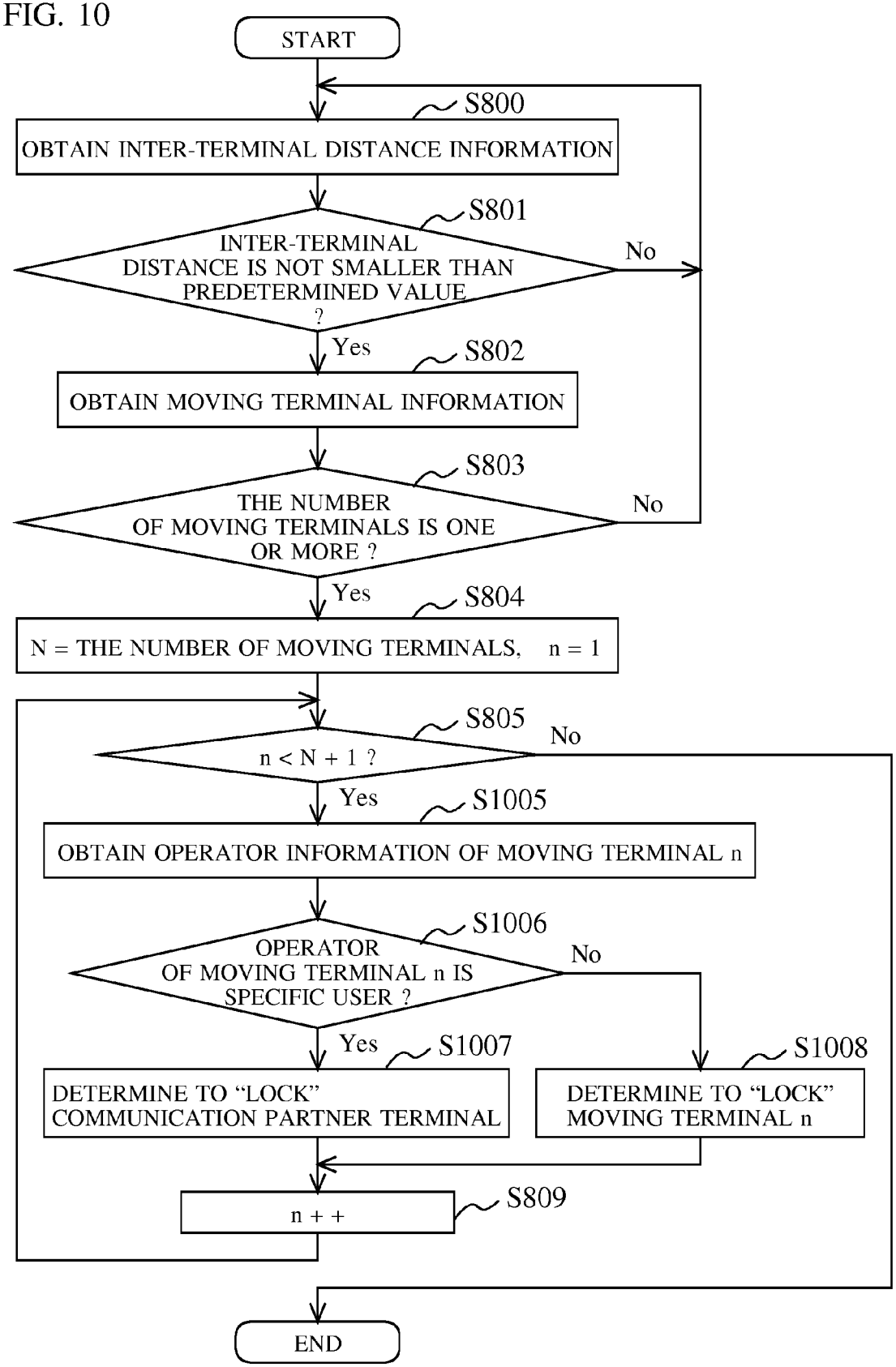
FIG. 10 is a flow chart showing an example of a process performed by a security process determining section 915.

FIG. 10 is a flow chart showing an example of a process, performed by the security process determining section 915, of determining a terminal on which to perform a security process according to the second embodiment of the present invention. It should be noted that, in FIG. 10, steps that perform the same processes as those in FIG. 8 are denoted by the same reference characters and description thereof will be omitted.

As a result of confirming the moving terminal information, when the number of moving terminals 502 is one or more (step S803, Yes), the security process determining section 915 obtains, for each moving terminal n determined as existing in step S803, the operator information of the moving terminal n at the corresponding time 700 (step S1005). When the moving terminal n is the share source terminal 900, the security process determining section 915 obtains the operator information A from the fingerprint authentication sensor 901. When the moving terminal n is the share destination terminal 910, the security process determining section 915 obtains the operator information B from the fingerprint authentication sensor 911. Then, when the operator of the moving terminal n is its corresponding specific user (step S1006, Yes), the security process determining section 915 determines that the terminal is being moved by the specific user, and determines to lock its communication partner terminal irrespective of whether it is moving or not (step S1007). Here, the communication partner terminal (not-moving terminal) means the share destination terminal 910 when the moving terminal n is the share source terminal 900, and means the share source terminal 900 when the moving terminal n is the share destination terminal 910. On the other hand, when the operator of the moving terminal n is not the specific user (step S1006, No), the security process determining section 915 determines that the terminal is being moved by a third party, and determines to lock the moving terminal n irrespective of whether it is moving or not (step S1008). A list of security processes performed by the control system according to the second embodiment is shown in FIG. 25.

As described above, in the control system according to the second embodiment of the present invention, when data is shared among a plurality of information communication terminals, execution of a security function (locking a terminal) can be flexibly controlled in accordance with the moving state of each terminal and the operator of the terminal.

Third Embodiment

Figure 11:
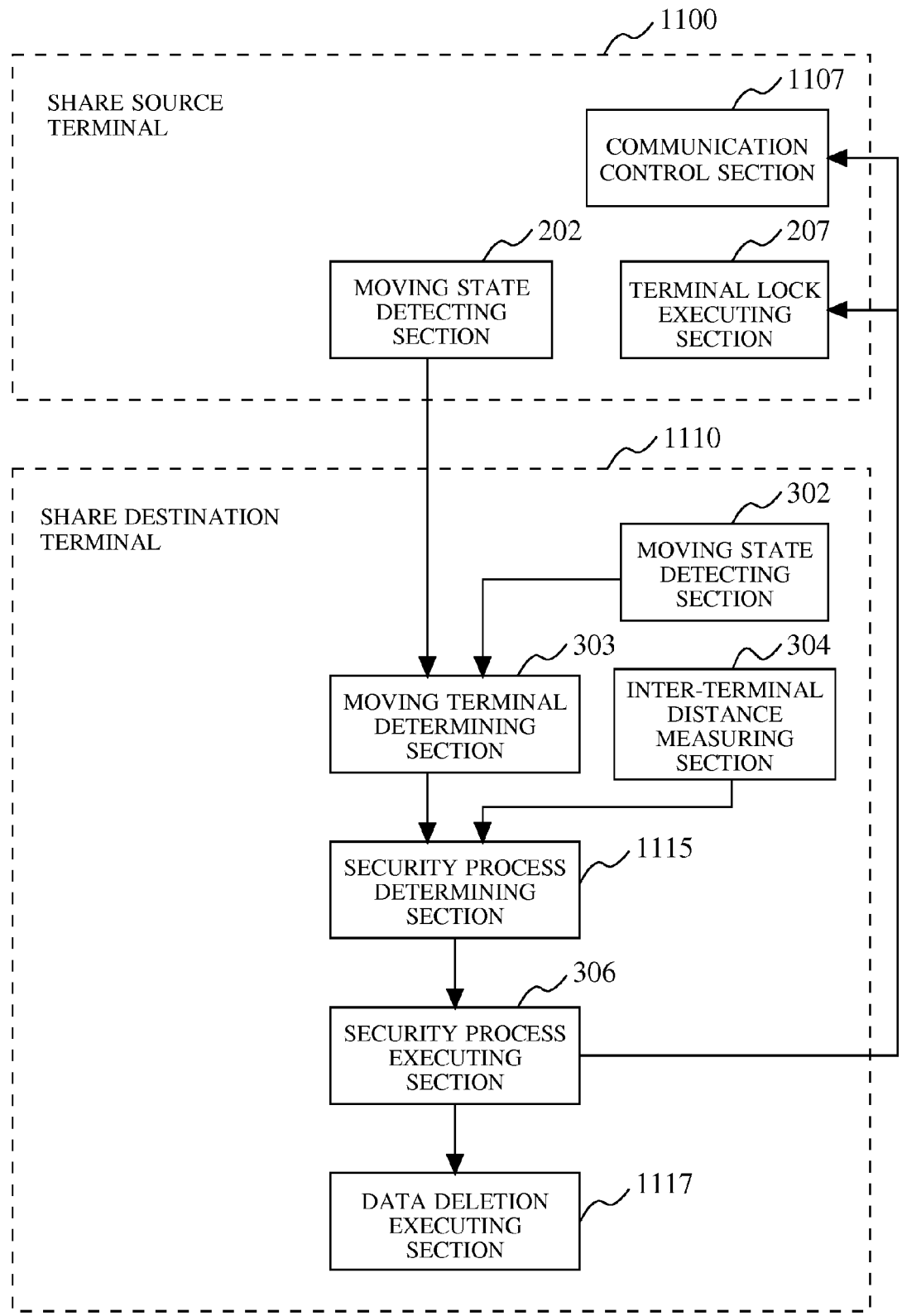
FIG. 11 shows internal configuration of a share source terminal 1100 and a share destination terminal 1110 forming a control system according to a third embodiment of the present invention.

FIG. 11 shows internal configurations of a share source terminal 1100 and a share destination terminal 1110 forming a control system according to a third embodiment of the present invention. The share source terminal 1100 includes the moving state detecting section 202, the terminal lock executing section 207, and a communication control section 1107. The share destination terminal 1110 includes the moving state detecting section 302, the moving terminal determining section 303, the inter-terminal distance measuring section 304, a security process determining section 1115, the security process executing section 306, and a data deletion executing section 1117.

The control system according to the third embodiment shown in FIG. 11 is different from that according to the first embodiment, in the configurations of the communication control section 1107 included in the share source terminal 1100, and the security process determining section 1115 and the data deletion executing section 1117 included in the share destination terminal 1110. Since the other configurations in the control system according to the third embodiment are the same as those of the first embodiment, they are denoted by the same reference characters, and description thereof will be omitted. Now, the communication control section 1107, the security process determining section 1115, and the data deletion executing section 1117 will be described.

The security process determining section 1115 determines a terminal and a function on which to perform a security process, based on the moving terminal information notified of by the moving terminal determining section 303, and the inter-terminal distance information notified of by the inter-terminal distance measuring section 304. The security process performed in the third embodiment includes deletion of data, turning off a communication function, and locking a terminal. The security process determining section 1115 notifies the security process executing section 306 of the terminal and the function on which the security process determining section 1115 has determined to perform the security process.

Based on the notification from the security process executing section 306, the data deletion executing section 1117 performs a process of deleting data that the share destination terminal 1110 shares with the share source terminal 1100. Deletion of data here is an example of security processes applied to the present invention, and another security process may be performed.

The communication control section 1107 performs a process of restricting communication performed by the share source terminal 1100, that is, a process of turning off the communication function thereof, based on the notification received via a communication interface from the security process executing section 306 which is included in the share destination terminal 1110. Turning off a communication function is an example of security processes applied to the present invention, and another security process may be performed.

Next, with reference to FIG. 12, the process, performed by the security process determining section 1115, of determining a terminal whose function should be restricted will be described.

Figure 12:
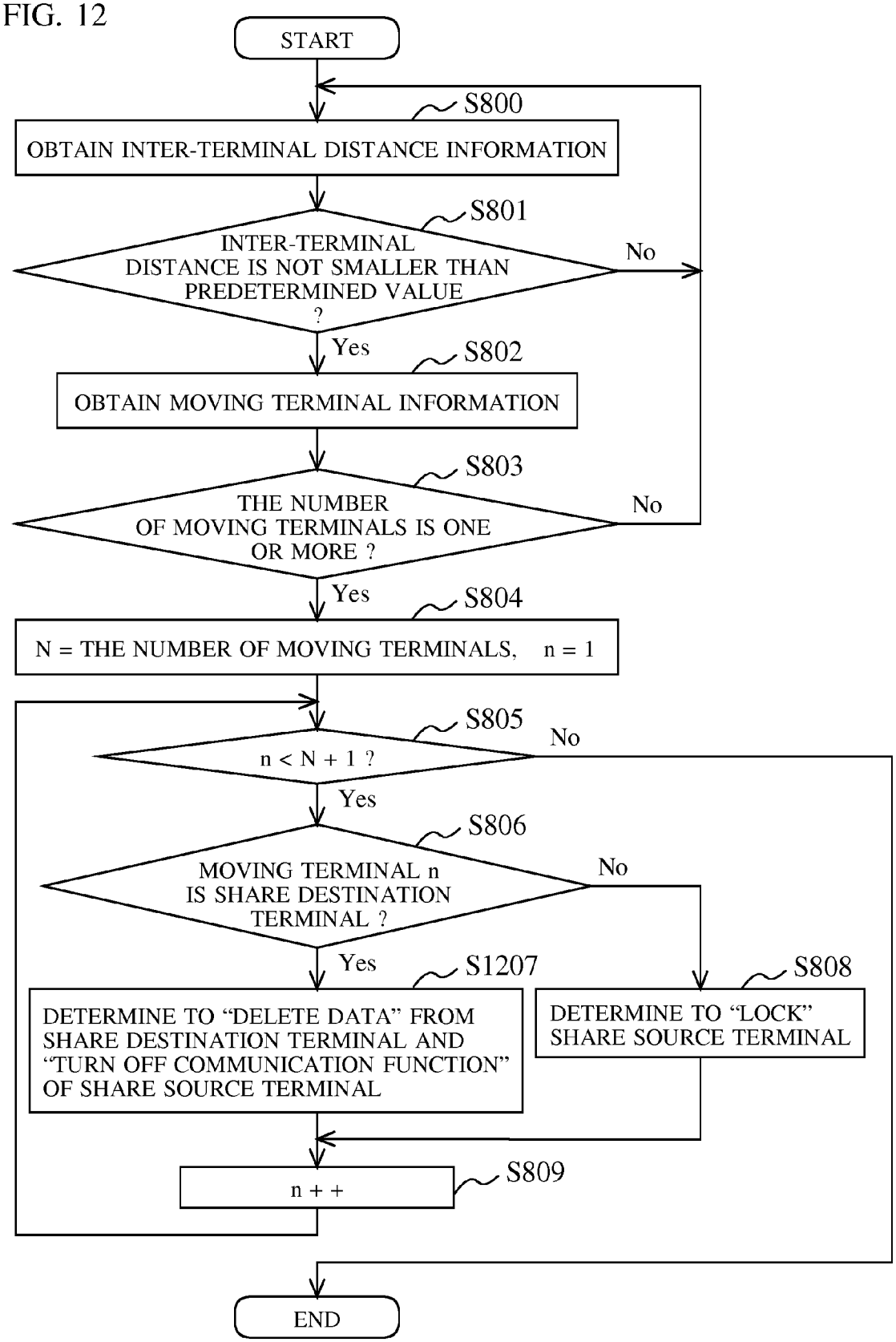
FIG. 12 is a flow chart showing an example of a process performed by a security process determining section 1115.

FIG. 12 is a flow chart showing an example of a process, performed by the security process determining section 1115, of determining a terminal and a function on which to perform a security process according to the third embodiment of the present invention. In FIG. 12, steps that perform the same processes as those in FIG. 8 are denoted by the same reference characters and description thereof will be omitted.

With respect to each moving terminal n determined as existing in step S803, the security process determining section 1115 confirms the terminal type (step S806). Then, when the moving terminal n is the share destination terminal 1110 (step S806, Yes), the security process determining section 1115 determines to turn off the communication function of the share source terminal 1100 irrespective of whether it is moving or not, and to delete shared data from the share destination terminal 1110 (step S1207). When the moving terminal n is the share source terminal 1100 (step S806, No), the security process determining section 1115 determines to lock the share source terminal 1100 (step S808). A list of security processes performed by the control system according to the third embodiment is shown in FIG. 26.

As described above, in the control system according to the third embodiment of the present invention, when data is shared among a plurality of information communication terminals, execution of security functions (turning off a communication function, deletion of data, and locking a terminal) can be flexibly controlled in accordance with the moving state of each terminal.

Fourth Embodiment

Figure 13:
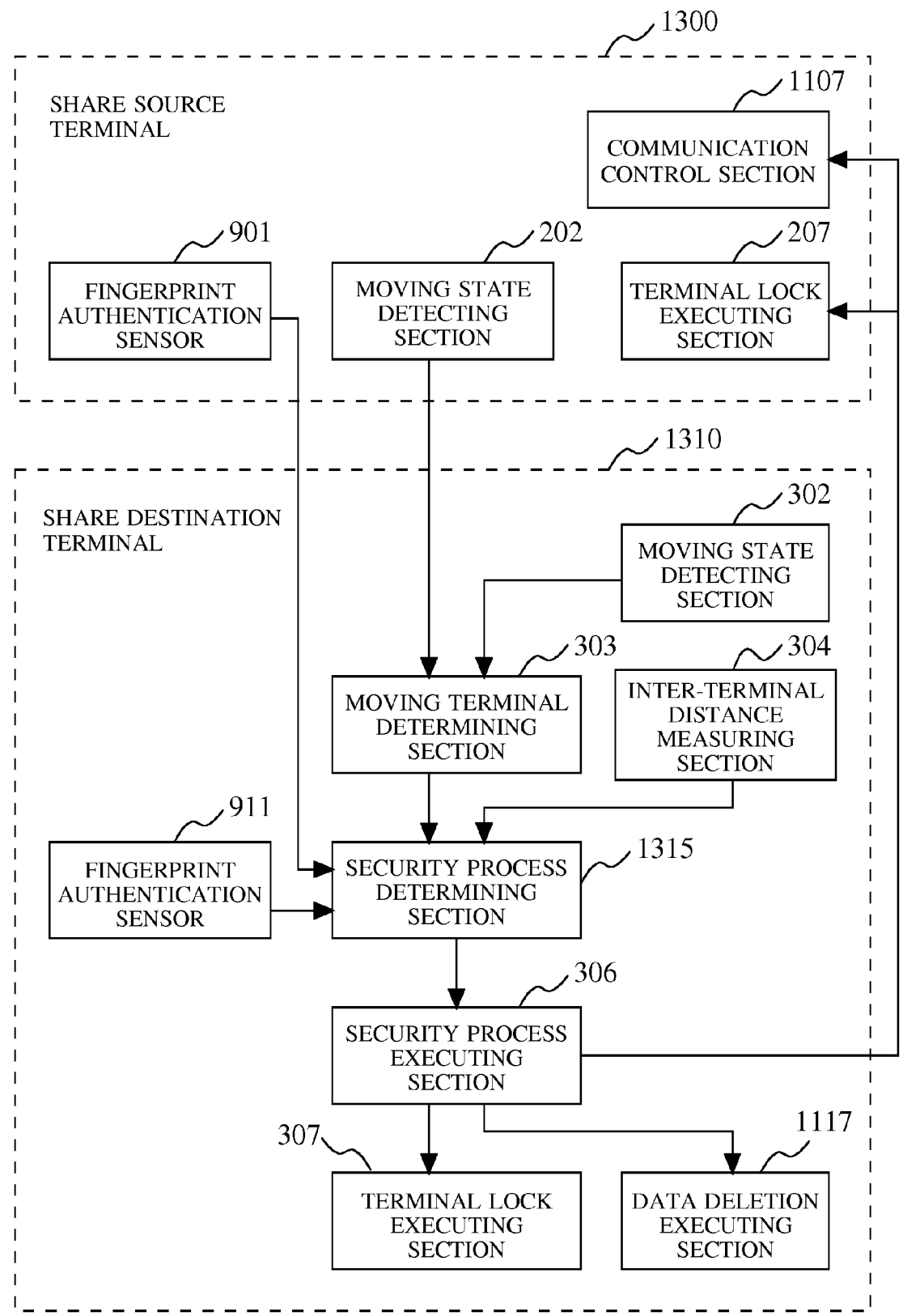
FIG. 13 shows internal configurations of a share source terminal 1300 and a share destination terminal 1310 forming a control system according to a fourth embodiment of the present invention.

FIG. 13 shows internal configurations of a share source terminal 1300 and a share destination terminal 1310 forming a control system according to a fourth embodiment of the present invention. The share source terminal 1300 includes the moving state detecting section 202, the terminal lock executing section 207, the communication control section 1107, and the fingerprint authentication sensor 901. The share destination terminal 1310 includes the moving state detecting section 302, the moving terminal determining section 303, the inter-terminal distance measuring section 304, a security process determining section 1315, the security process executing section 306, the terminal lock executing section 307, the data deletion executing section 1117, and the fingerprint authentication sensor 911.

The control system according to the fourth embodiment shown in FIG. 13 is different from that according to the second embodiment, in the configurations of the communication control section 1107 included in the share source terminal 1300 and the security process determining section 1315 and the data deletion executing section 1117 included in the share destination terminal 1310. Since the other configurations in the control system according to the fourth embodiment are the same as those of the second embodiment, they are denoted by the same reference characters, and description thereof will be omitted. Now, the communication control section 1107, the security process determining section 1315, and the data deletion executing section 1117 will be described.

The security process determining section 1315 determines a terminal and a function on which to perform a security process, based on the operator information A notified of by the fingerprint authentication sensor 901, the operator information B notified of by the fingerprint authentication sensor 911, the moving terminal information notified of by the moving terminal determining section 303, and the inter-terminal distance information notified of by the inter-terminal distance measuring section 304. The security process performed in the fourth embodiment includes deletion of data, turning off a communication function, and locking a terminal. The security process determining section 1315 notifies the security process executing section 306 of the terminal and the function on which the security process determining section 1315 has determined to perform the security process.

Based on the notification from the security process executing section 306, the data deletion executing section 1117 performs a process of deleting data that the share destination terminal 1310 shares with the share source terminal 1300. Deletion of data here is an example of security processes applied to the present invention, and another security process may be performed.

The communication control section 1107 performs a process of restricting communication performed by the share source terminal 1300, that is a process of turning off the communication function thereof, based on the notification received via a communication interface from the security process executing section 306 included in the share destination terminal 1310. Turning off a communication function is an example of security processes applied to the present invention, and another security process may be performed.

Next, with reference to FIG. 14, the process, performed by the security process determining section 1315, of determining a terminal whose function should be restricted will be described.

Figure 14:
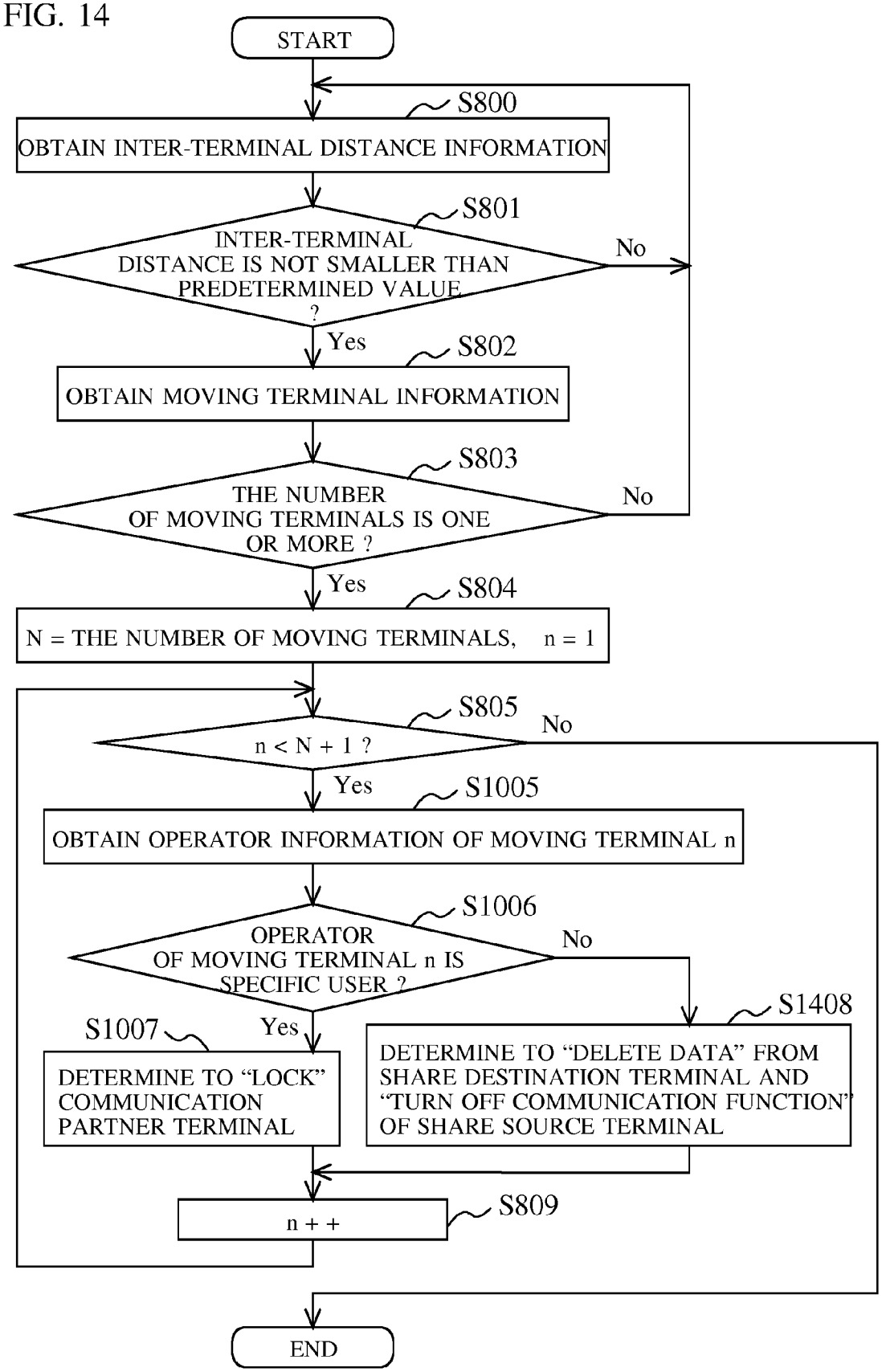
FIG. 14 is a flow chart showing an example of a process performed by a security process determining section 1315.

FIG. 14 is a flow chart showing an example of a process, performed by the security process determining section 1315, of determining a terminal and a function on which to perform a security process according to the fourth embodiment of the present invention. In FIG. 14, steps that perform the same processes as those in FIG. 8 and FIG. 10 are denoted by the same reference characters and description thereof will be omitted.

Based on the operator information A and B obtained from the fingerprint authentication sensors 901 and 911, when having determined that the operator of the moving terminal n is its corresponding specific user (step S1006, Yes), the security process determining section 915 determines that the terminal is being moved by the specific user, and determines to lock its communication partner terminal irrespective of whether it is moving or not (step S1107). On the other hand, when having determined that the operator of the moving terminal n is not the specific user based on the operator information A and B (step S1006, No), the security process determining section 915 determines to turn off the communication function of the share source terminal 1300 irrespective of whether it is moving or not and to delete shared data from the share destination terminal 1310 (step S1408). A list of security processes performed by the control system according to the fourth embodiment is shown in FIG. 27.

As described above, in the control system according to the fourth embodiment of the present invention, when data is shared among a plurality of information communication terminals, execution of security functions (turning off a communication function, deletion of data, and locking a terminal) can be flexibly controlled in accordance with the moving state of each terminal and the operator of the terminal.

Fifth Embodiment

Figure 15:
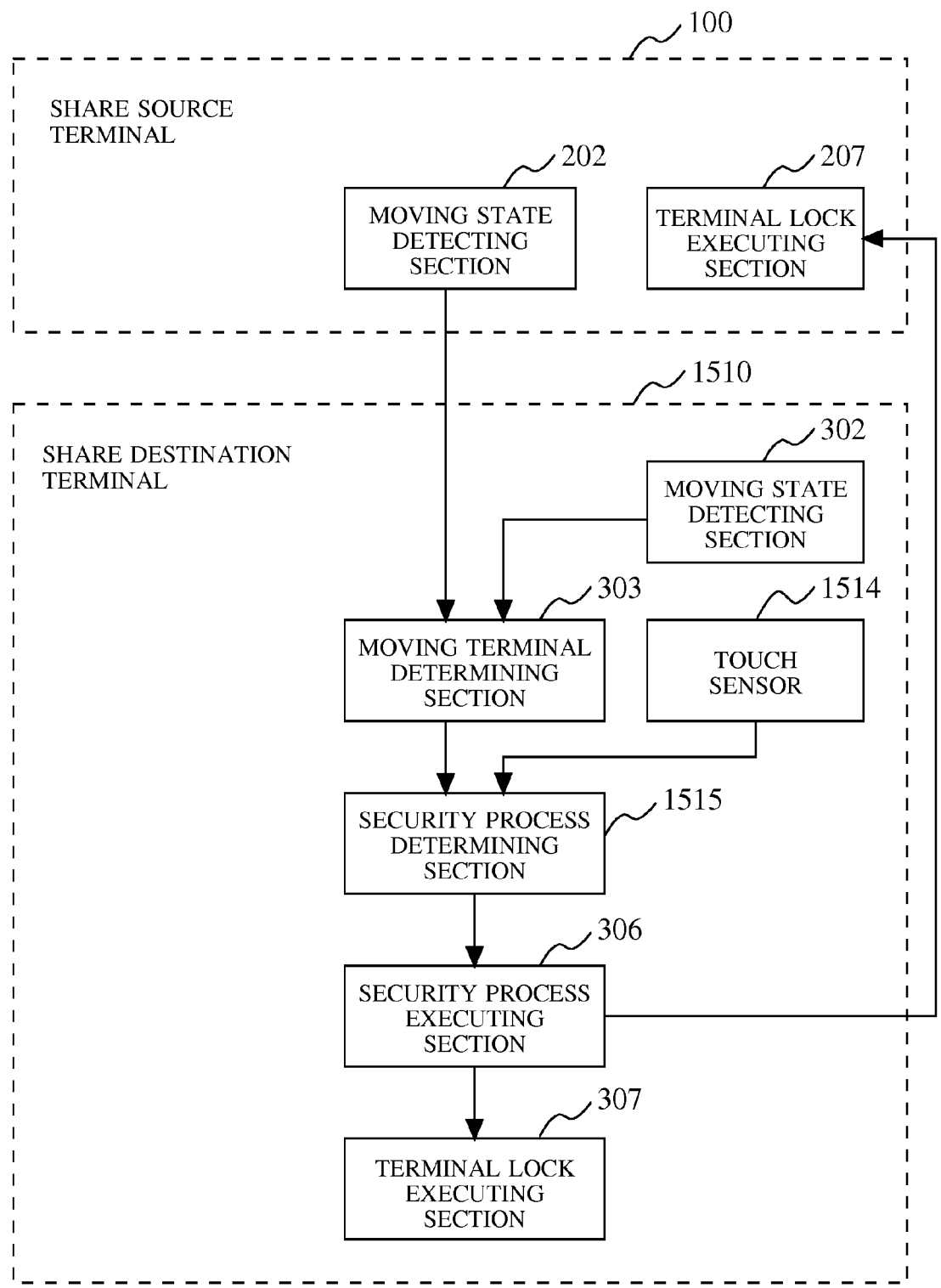
FIG. 15 shows internal configurations of the share source terminal 100 and a share destination terminal 1510 forming a control system according to a fifth embodiment of the present invention.

FIG. 15 shows internal configurations of the share source terminal 100 and a share destination terminal 1510 forming a control system according to a fifth embodiment of the present invention. The share source terminal 100 includes the moving state detecting section 202 and the terminal lock executing section 207. The share destination terminal 1510 includes the moving state detecting section 302, the moving terminal determining section 303, a touch sensor 1514, a security process determining section 1515, the security process executing section 306, and the terminal lock executing section 307.

The control system according to the fifth embodiment shown in FIG. 15 is different from that according to the first embodiment, in the configurations of the touch sensor 1514 and the security process determining section 1515 included in the share destination terminal 1510. Since the other configurations in the control system according to the fifth embodiment are the same as those of the first embodiment, they are denoted by the same reference characters, and description thereof will be omitted. Now, the touch sensor 1514 and the security process determining section 1515 will be described.

The touch sensor 1514 detects (presence of absence of) an operation performed onto the share destination terminal 1510, and notifies the security process determining section 1515 of the detected result as operation information. The touch sensor 1514 is an example of a configuration (operation detecting section) for detecting an operation applied to the present invention, and various well-known technologies other than this example can be used. Further, the touch sensor 1514 may be provided on the share source terminal 100 side, or may be provided in each of the share source terminal 100 and the share destination terminal 1510.

FIG. 16 shows an example of operation information detected by the touch sensor 1514. The operation information is composed of time 1600 and operation 1601. The time 1600 is information indicating time at which the touch sensor 1514 detected the operation 1601, and corresponds to the time 400 of the movement information A and the time 402 of the movement information B. The operation 1601 is information indicating whether there is an operation performed onto the share destination terminal 110. The operation information illustrated in FIG. 16 shows that at times 30 ms, 60 ms, 90 ms, 120 ms, 150 ms, and 180 ms, the operation onto the terminal was performed, not performed, not performed, not performed, not performed, and not performed, respectively.

The security process determining section 1515 determines a terminal on which to perform a security process, based on the moving terminal information notified of by the moving terminal determining section 303 and the operation information notified of by the touch sensor 1514. The security process performed in the fifth embodiment is locking a terminal. The security process determining section 1515 notifies the security process executing section 306 of the terminal on which the security process determining section 1515 has determined to perform the security process.

Next, with reference to FIG. 17, the process, performed by the security process determining section 1515, of determining a terminal whose function should be restricted will be described.

Figure 17:
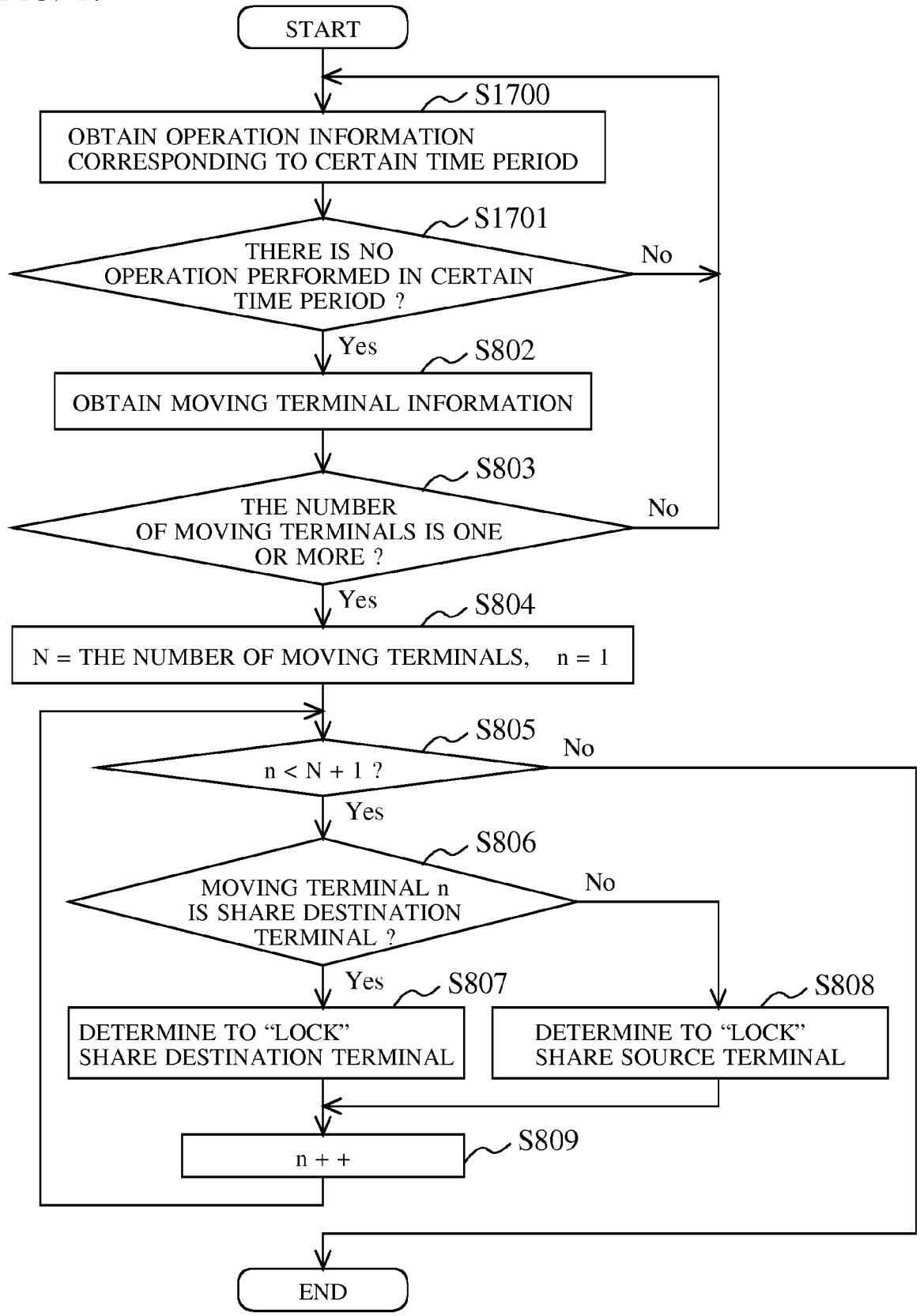
FIG. 17 is a flow chart showing an example of a process performed by a security process determining section 1515.

FIG. 17 is a flow chart showing an example of a process, performed by the security process determining section 1515, of determining a terminal on which to perform a security process according to the fifth embodiment of the present invention. It should be noted that, in FIG. 17, steps that perform the same processes as those in FIG. 8 are denoted by the same reference characters and description thereof will be omitted.

In the process of determining a terminal on which to perform the security process of the fifth embodiment, the security process determining section 305 obtains operation information corresponding to a certain time period (e.g., 90 ms) from the touch sensor 1514 (step S1700), and determines whether there is no operation performed onto the share destination terminal 1510 in the certain time period with reference to the operation 1601 (step S1701). Then, only when there is no operation performed onto the share destination terminal 1510 in the certain time period (step S1701, Yes), the security process determining section 1515 performs the process of determining a terminal based on steps S802 to S809 described in the first embodiment. A list of security processes performed by the control system according to the fifth embodiment is shown in FIG. 24.

As described above, in the control system according to the fifth embodiment of the present invention, when data is shared among a plurality of information communication terminals, execution of a security function (locking a terminal) can be flexibly controlled in accordance with the operation state of each terminal and the moving state of the terminal.

Sixth Embodiment

Figure 18:
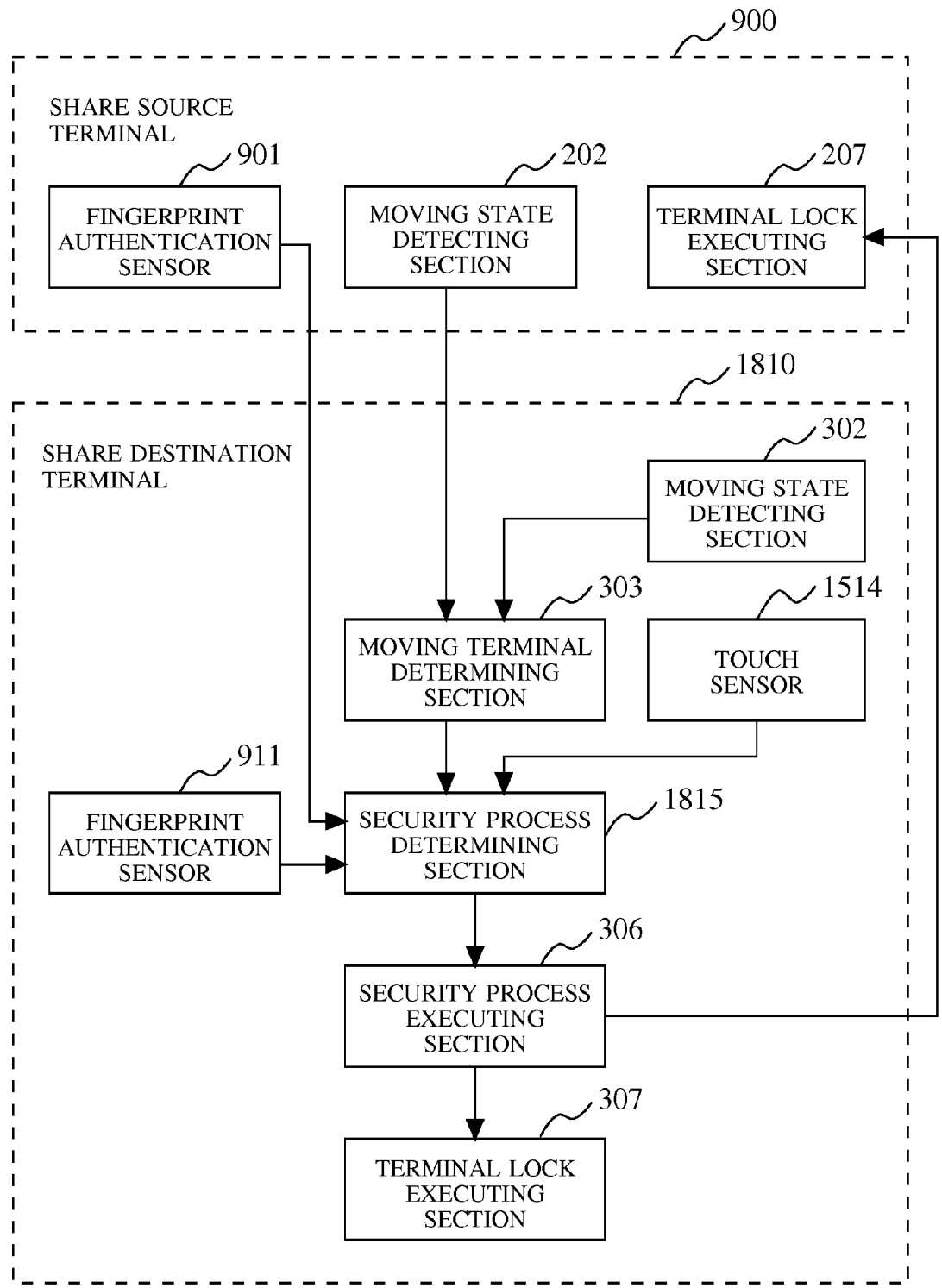
FIG. 18 shows internal configurations of the share source terminal 900 and a share destination terminal 1810 forming a control system according to a sixth embodiment of the present invention.

FIG. 18 shows internal configurations of the share source terminal 900 and a share destination terminal 1810 forming a control system according to a sixth embodiment of the present invention. The share source terminal 900 includes the moving state detecting section 202, the terminal lock executing section 207, and the fingerprint authentication sensor 901. The share destination terminal 1810 includes the moving state detecting section 302, the moving terminal determining section 303, the touch sensor 1514, a security process determining section 1815, the security process executing section 306, the terminal lock executing section 307, and the fingerprint authentication sensor 911.

The control system according to the sixth embodiment shown in FIG. 18 is different from that according to the second embodiment, in the configurations of the touch sensor 1514 and the security process determining section 1815 included in the share destination terminal 1810. Since the other configurations in the control system according to the sixth embodiment are the same as those in the second embodiment, they are denoted by the same reference characters, and description thereof will be omitted. Now, the touch sensor 1514 and the security process determining section 1815 will be described.

The touch sensor 1514 has the same configuration as that described in the fifth embodiment, detects an operation performed onto the share destination terminal 1810, and notifies the security process determining section 1815 of the detected result as operation information (FIG. 16).

The security process determining section 1815 determines a terminal on which to perform a security process, based on the operator information A notified of by the fingerprint authentication sensor 901, the operator information B notified of by the fingerprint authentication sensor 911, the moving terminal information notified of by the moving terminal determining section 303, and the operation information notified of by the touch sensor 1514. The security process performed in the sixth embodiment is locking a terminal. The security process determining section 1815 notifies the security process executing section 306 of the terminal on which the security process determining section 1815 has determined to perform the security process.

Next, with reference to FIG. 19, the process, performed by the security process determining section 1815, of determining a terminal whose function should be restricted will be described.

Figure 19:
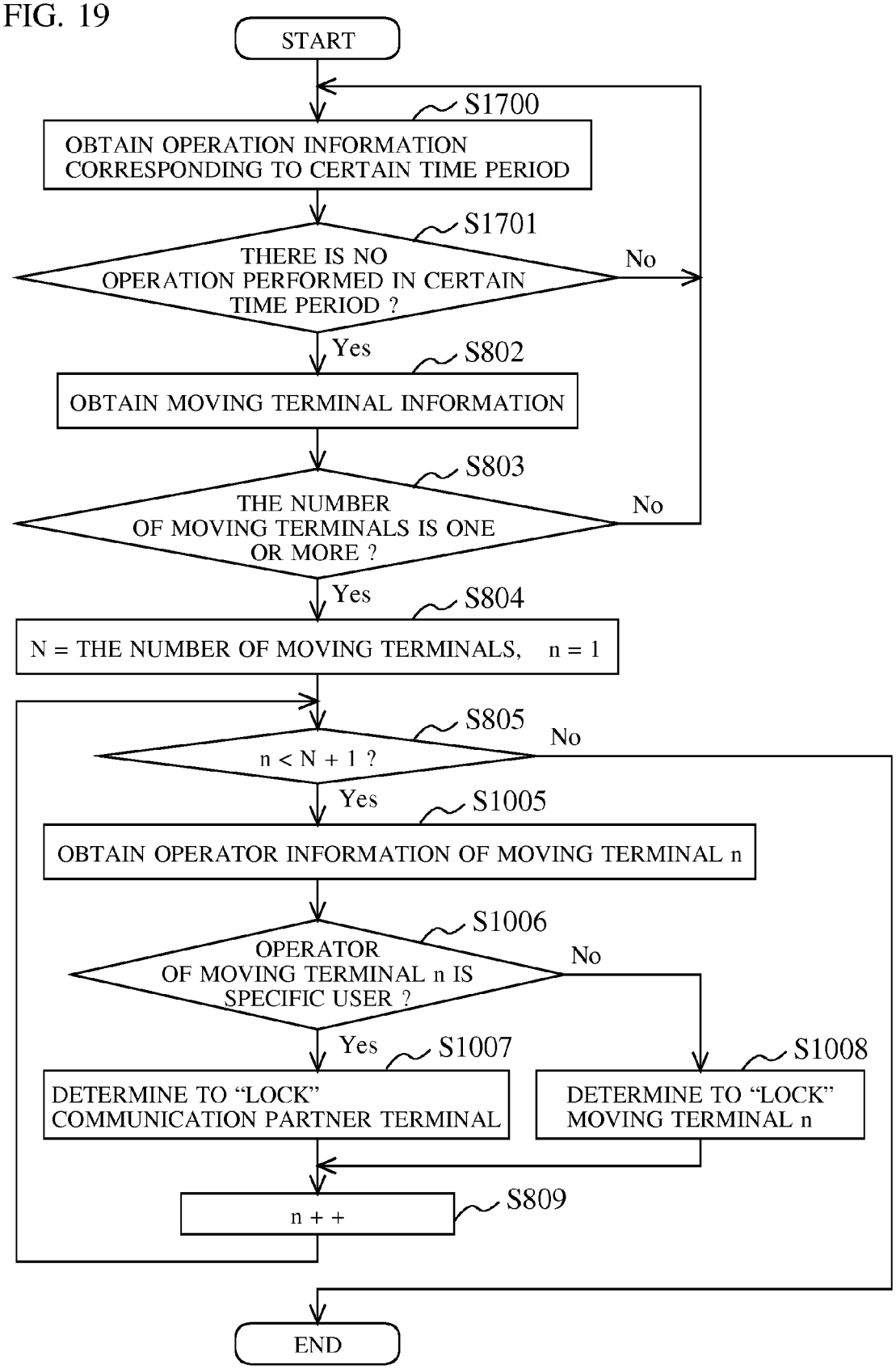
FIG. 19 is a flow chart showing an example of a process performed by a security process determining section 1815.

FIG. 19 is a flow chart showing an example of a process, performed by the security process determining section 1815, of determining a terminal on which to perform a security process according to the sixth embodiment of the present invention. It should be noted that, in FIG. 19, step that perform the same processes as those in FIG. 10 are denoted by the reference characters and description thereof will be omitted.

In the process of determining a terminal on which to perform the security process of the sixth embodiment, the security process determining section 305 obtains operation information corresponding to a certain time period from the touch sensor 1514 (step S1700), and determines whether there is no operation performed onto the share destination terminal 1510 in the certain time period with reference to the operation 1601 (step S1701). Then, only when there is no operation performed onto the share destination terminal 1810 in the certain time period (step S1701, Yes), the security process determining section 1815 performs the process of determining a terminal based on steps S802 to S805, S1005 to S1008, and S809 described in the second embodiment. A list of security processes performed by the control system according to the sixth embodiment is shown in FIG. 25.

As described above, in the control system according to the sixth embodiment of the present invention, when data is shared among a plurality of information communication terminals, execution of a security function (locking a terminal) can be flexibly controlled in accordance with the operation state of each terminal, the moving state of the terminal, and the operator of the terminal.

Seventh Embodiment

Figure 20:
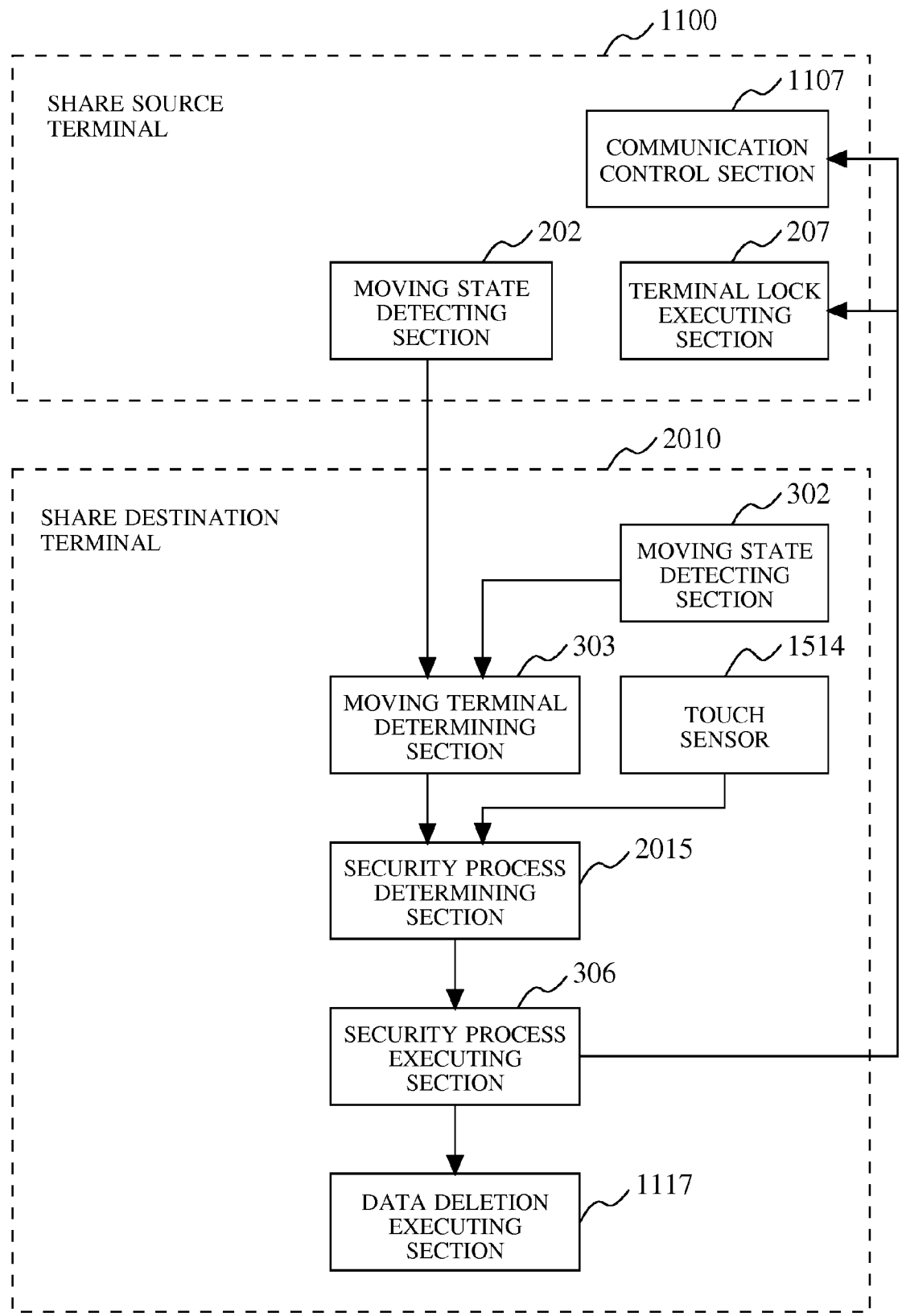
FIG. 20 shows internal configurations of the share source terminal 1100 and a share destination terminal 1110 forming a control system according to a seventh embodiment of the present invention.

FIG. 20 shows internal configurations of the share source terminal 1100 and a share destination terminal 2010 forming a control system according to a seventh embodiment of the present invention. The share source terminal 1100 includes the moving state detecting section 202, the terminal lock executing section 207, and the communication control section 1107. The share destination terminal 2010 includes the moving state detecting section 302, the moving terminal determining section 303, the touch sensor 1514, a security process determining section 2015, the security process executing section 306, and the data deletion executing section 1117.

The control system according to the seventh embodiment shown in FIG. 20 is different from that according to the third embodiment, in the configurations of the touch sensor 1514 and the security process determining section 2015 included in the share destination terminal 2010. Since the other configurations in the control system according to the seventh embodiment are the same as those in the third embodiment, they are denoted by the same reference characters, and description thereof will be omitted. Now, the touch sensor 1514 and the security process determining section 2015 will be described.

The touch sensor 1514 has the same configuration as that described in the fifth embodiment, detects an operation performed onto the share destination terminal 2010, and notifies the security process determining section 2015 of the detected result as operation information (FIG. 16).

The security process determining section 2015 determines a terminal and a function on which to perform a security process, based on the moving terminal information notified of by the moving terminal determining section 303 and the operation information notified of by the touch sensor 1514. The security process performed in the seventh embodiment includes deletion of data, turning off a communication function, and locking a terminal. The security process determining section 2015 notifies the security process executing section 306 of the terminal and the function on which the security process determining section 2015 has determined to perform the security process.

Next, with reference to FIG. 21, the process, performed by the security process determining section 2015, of determining a terminal whose function should be restricted will be described.

Figure 21:
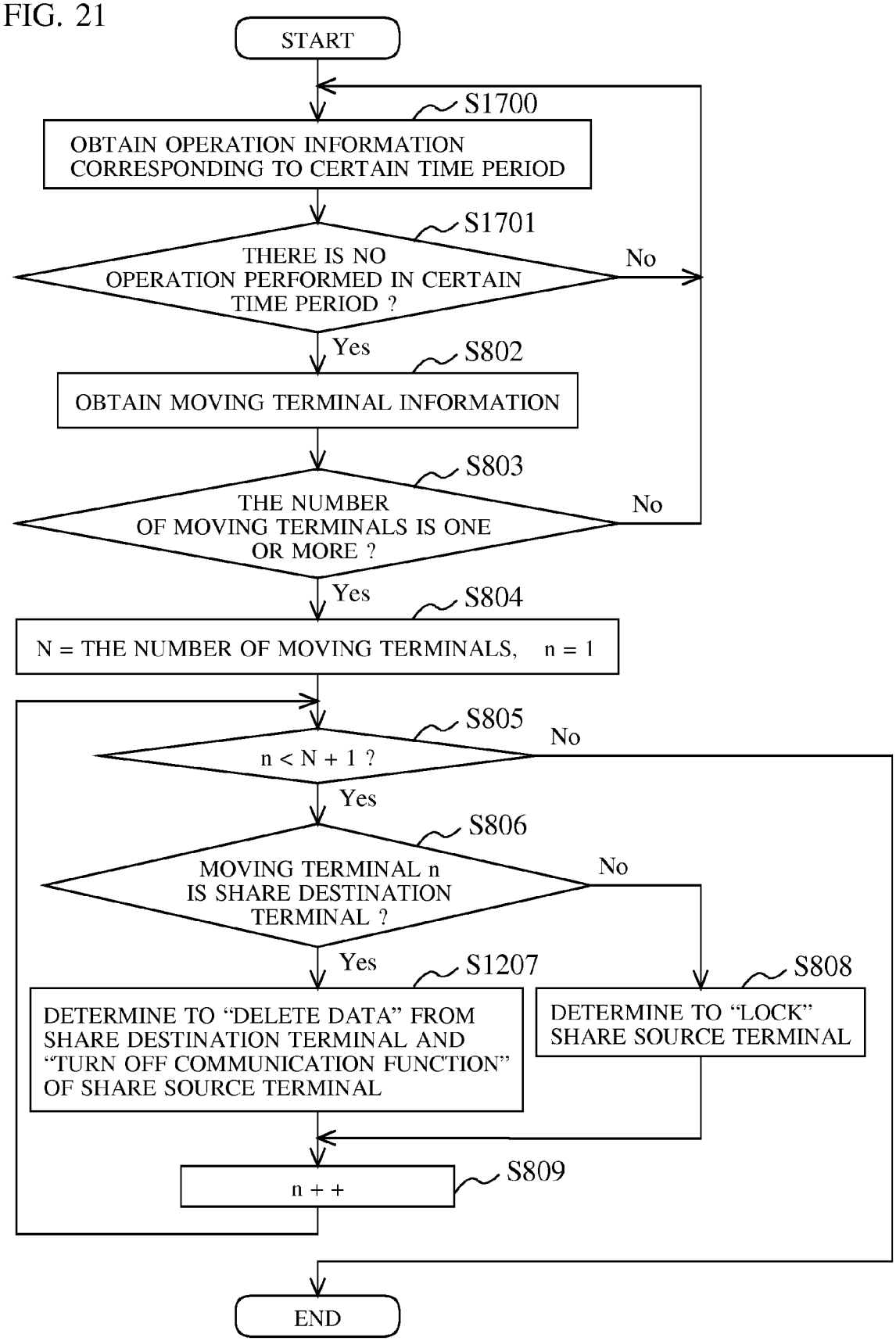
FIG. 21 is a flow chart showing an example of a process performed by a security process determining section 2015.

FIG. 21 is a flow chart showing an example of a process, performed by the security process determining section 2015, of determining a terminal and a function on which to perform a security process according to the seventh embodiment of the present invention. It should be noted that, in FIG. 21, steps that perform the same processes as those in FIG. 12 are denoted by the same reference characters and description thereof will be omitted.

In the process of determining a terminal and a function on which to perform the security process of the seventh embodiment, the security process determining section 2015 obtains operation information corresponding to a certain time period from the touch sensor 1514 (step S1700), and determines whether there is no operation performed onto the share destination terminal 2010 in the certain time period with reference to the operation 1601 (step S1701). Then, only when there is no operation performed onto the share destination terminal 2010 in the certain time period, the security process determining section 2015 performs the process of determining a terminal and a function based on steps S802 to S806, S1207, S808, and S809 described in the third embodiment. A list of security processes performed by the control system according to the seventh embodiment is shown in FIG. 26.

As described above, in the control system according to the seventh embodiment of the present invention, when data is shared among a plurality of information communication terminals, execution of security functions (turning off a communication function, deletion of data, and locking a terminal) can be flexibly controlled in accordance with the operation state of each terminal and the moving state of the terminal.

Eighth Embodiment

Figure 22:
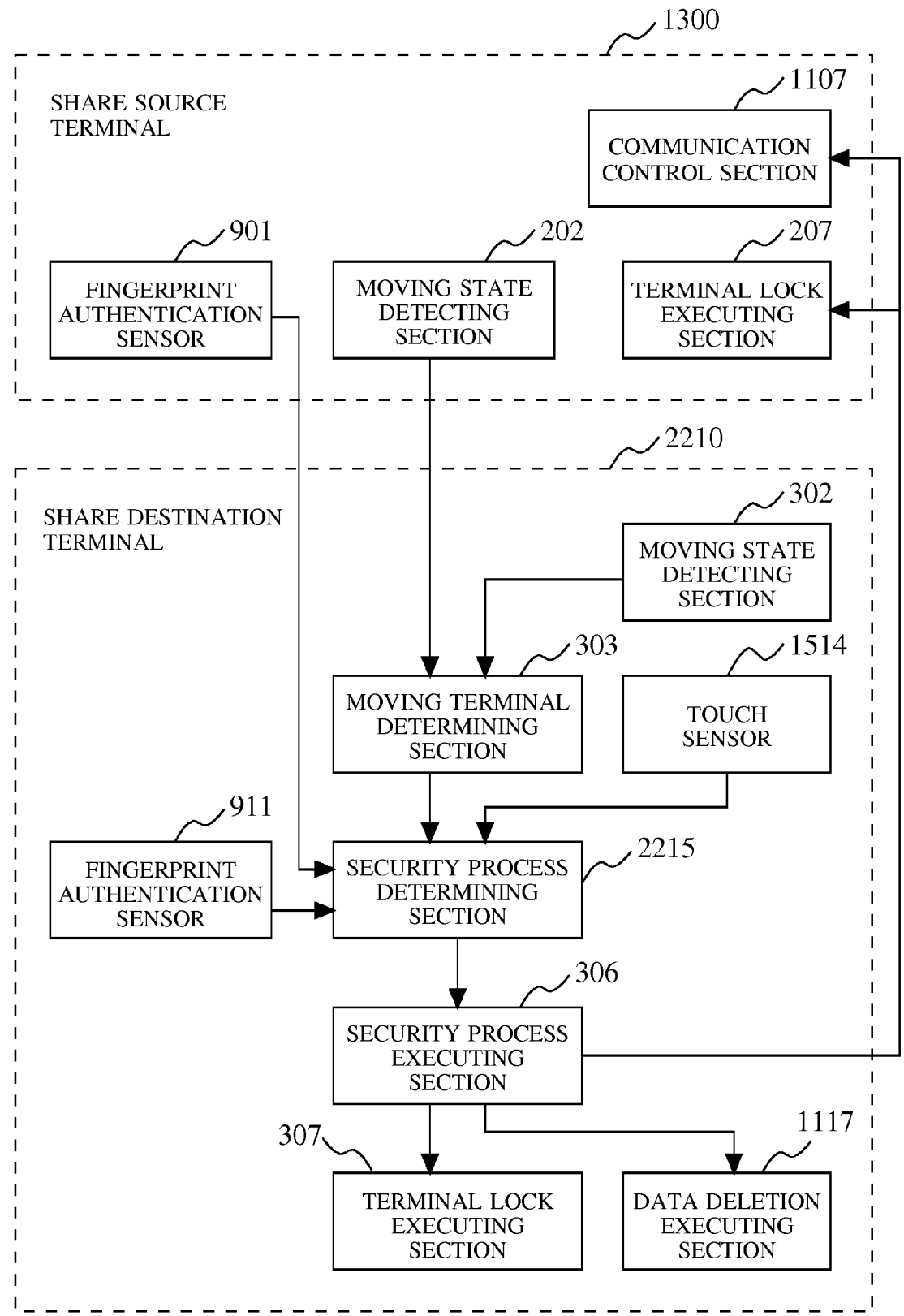
FIG. 22 shows internal configurations of the share source terminal 1300 and a share destination terminal 2210 forming a control system according to an eighth embodiment of the present invention.

FIG. 22 shows internal configurations of the share source terminal 1300 and a share destination terminal 2210 forming a control system according to an eighth embodiment of the present invention. The share source terminal 1300 includes the moving state detecting section 202, the terminal lock executing section 207, the communication control section 1107, and the fingerprint authentication sensor 901. The share destination terminal 2210 includes the moving state detecting section 302, the moving terminal determining section 303, the touch sensor 1514, a security process determining section 2215, the security process executing section 306, the terminal lock executing section 307, the data deletion executing section 1117, and the fingerprint authentication sensor 911.

The control system according to the eighth embodiment shown in FIG. 22 is different from that according to the fourth embodiment, in the configurations of the touch sensor 1514 and the security process determining section 2215 included in the share destination terminal 2210. Since the other configurations in the control system according to the eighth embodiment are the same as those of the fourth embodiment, they are denoted by the same reference characters, and description thereof will be omitted. Now, the touch sensor 1514 and the security process determining section 2215 will be described.

The touch sensor 1514 has the same configuration as that described in the fifth embodiment, detects an operation performed onto the share destination terminal 2210, and notifies the security process determining section 2215 of the detected result as operation information (FIG. 16).

The security process determining section 2215 determines a terminal and a function on which to perform a security process, based on the operator information A notified of by the fingerprint authentication sensor 901, the operator information B notified of by the fingerprint authentication sensor 911, the moving terminal information notified of by the moving terminal determining section 303, and the operation information notified of by the touch sensor 1514. The security process performed in the eighth embodiment includes deletion of data, turning off a communication function, and locking a terminal. The security process determining section 2215 notifies the security process executing section 306 of the terminal and the function on which the security process determining section 2215 has determined to perform the security process.

Next, with reference to FIG. 23, the process, performed by the security process determining section 2215, of determining a terminal whose function should be restricted will be described.

Figure 23:
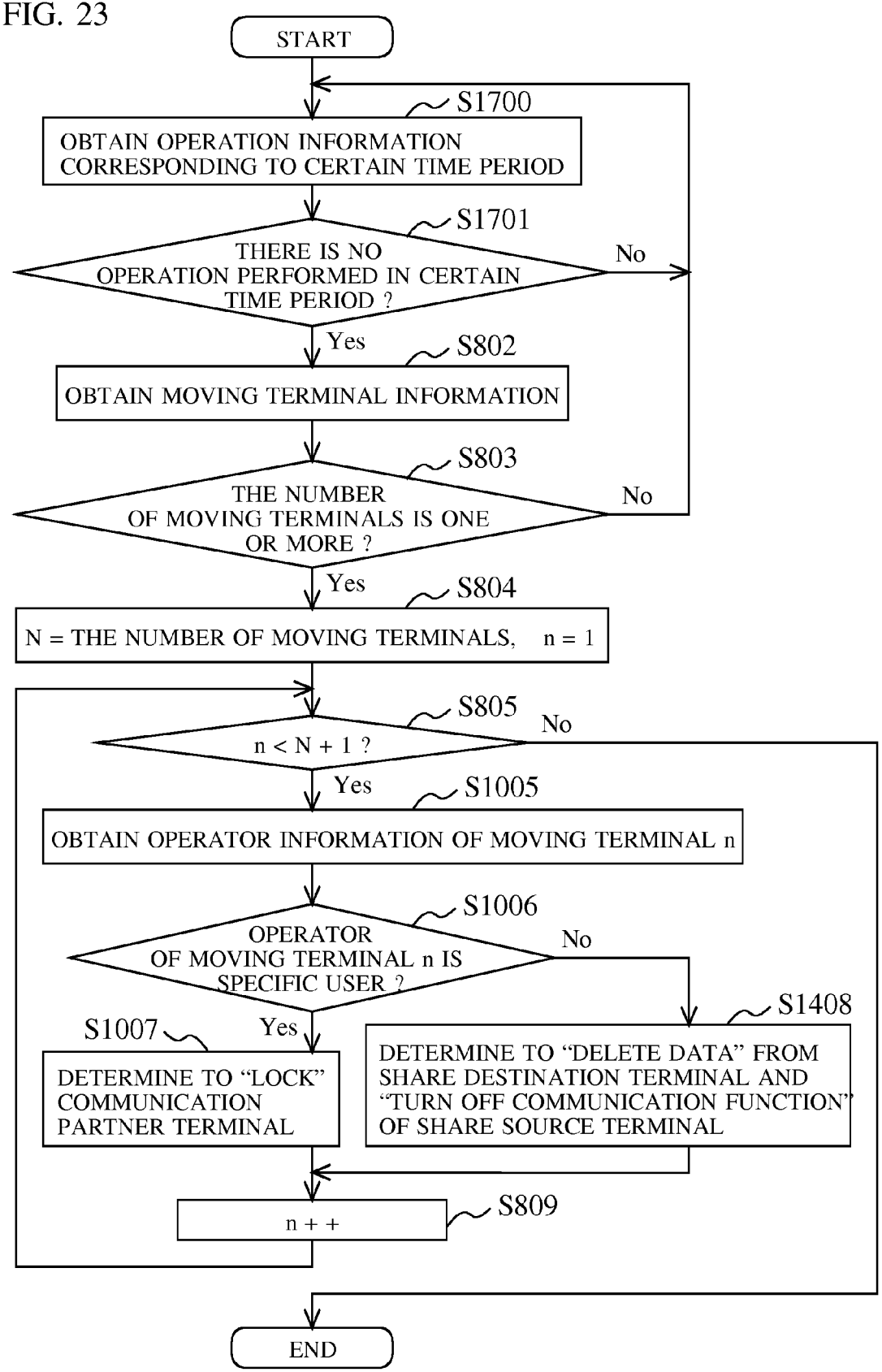
FIG. 23 is a flow chart showing an example of a process performed by a security process determining section 2215.

FIG. 23 is a flow chart showing an example of a process, performed by the security process determining section 2215, of determining a terminal and a function on which to perform a security process according to the eighth embodiment of the present invention. It should be noted that, in FIG. 23, step that perform the same processes as those in FIG. 14 are denoted by the same reference characters and description thereof will be omitted.

In the process of determining a terminal and a function on which to perform the security process of the eighth embodiment, the security process determining section 2215 obtains operation information corresponding to a certain time period from the touch sensor 1514 (step S1700), and determines whether there is no operation performed onto the share destination terminal 2210 in the certain time period with reference to the operation 1601 (step S1701). Then, only when there is no operation performed onto the share destination terminal 2210 in the certain time period (step S1701, Yes), the security process determining section 2215 performs the process of determining a terminal and a function based on steps S802 to S805, S1005 to S1007, S1408, and S809 described in the fourth embodiment. A list of security processes performed by the control system according to the eighth embodiment is shown in FIG. 27.

As described above, in the control system according to the eighth embodiment of the present invention, when data is shared among a plurality of information communication terminals, execution of security functions (turning off a communication function, deletion of data, and locking a terminal) can be flexibly controlled in accordance with the operation state of each terminal, the moving state of the terminal, and the operator of the terminal.

It should be noted that a part or the whole of the functional blocks of the share source terminal and the share destination terminal forming the control system of each embodiment of the present invention is realized by using hardware resources such as a central processing unit (CPU), a storage device (memory (ROM, RAM, etc.), a hard disk, etc.), and an input/ output device, and typically implemented as an IC being an integrated circuit (also referred to as LSI, system LSI, super LSI, ultra LSI, etc.). These functional blocks may be implemented in individual chips, or a part or the whole of them may be implemented in one chip.

Further, the method for circuit integration is not limited to the IC, and may be realized by a dedicated circuit or a general-purpose processor. An FPGA (Field Programmable Gate Array) that can be programmed after manufacture of the IC or a reconfigurable processor that allows connections and settings of the circuit cell in the IC to be reconfigured may be used.

Still further, in a case where another circuit integration technology (such as biotechnology) replacing the IC becomes available as a result of improvement of a semiconductor technology or emergence of another technology derived therefrom, the functional blocks may be, of course, integrated using the technology.

The security control performed by the control system according to each embodiment of the present invention may be realized by the CPU interpreting and executing predetermined program data capable of executing the processes of the security control stored in the storage device. In this case, the program data may be loaded onto the storage device via a storage medium such as a DVD-ROM, a flexible disk, or the like, or may be directly executed on the storage medium. Here, the storage medium includes: a semiconductor memory such as a ROM, a RAM, and a flash memory; a magnetic disk memory such as a flexible disk and a hard disk; an optical disk memory such as a DVD and a BD; and a memory card; and the like. Further, the storage medium is a notion including a communication medium such as a telephone line, a carrier path, and the like.

INDUSTRIAL APPLICABILITY

The control system of the present invention can be used in a communication system and the like that includes a plurality of information communication terminals. The control system of the present invention is particularly useful, for example, in the case where data is shared among a plurality of information communication terminals and it is desired to flexibly control execution of a security function.

DESCRIPTION OF THE REFERENCE CHARACTERS 10 tablet PC
11, 21 display screen
20 mobile phone
22 button
30 notebook PC
40 network
100, 900, 1100, 1300 share source terminal
110, 910, 1110, 1310, 1510, 1810, 2010, 2210 share destination terminal
202, 302 moving state detecting section
207, 307 terminal lock executing section
303 moving terminal determining section
304 inter-terminal distance measuring section
305, 915, 1115, 1315, 1515, 1815, 2015, 2215 security process determining section
306 security process executing section
901, 911 fingerprint authentication sensor
1107 communication control section
1117 data deletion executing section
1514 touch sensor

The invention claimed is:

1. A control system formed by at least two wireless terminals that share data, the control system comprising:
a first terminal and a second terminal, wherein
the first terminal includes a first processor and a first memory having stored thereon first executable instructions, which when executed by the first processor, cause the first terminal to function as:
a first moving state detecting section configured to detect whether the first terminal itself is in a moving state and to notify the second terminal of a result of the detection,
the second terminal includes a second processor and a second memory having stored thereon second executable instructions, which when executed by the second processor, cause the second terminal to function as:
a second moving state detecting section configured to detect whether the second terminal itself is in a moving state;
a moving terminal determining section configured to determine whether a moving terminal that is currently moving is the first terminal, the second terminal, or both of the first terminal and the second terminal, based on the result of the detection notified of by the first moving state detecting section and a result detected by the second moving state detecting section;
a security process determining section configured to determine a terminal on which to perform a security process and a content of the security process, in accordance with a specific condition and the moving terminal determined by the moving terminal determining section; and
a security process executing section configured to perform the security process determined by the security process determining section,
the specific condition is whether an operator is a specific user, and
the security process includes a process of locking a not-moving terminal if an operator of the moving terminal is the specific user.

2. The control system according to claim 1, wherein the second executable instructions, when executed by the second processor, cause the second terminal to further function as an inter-terminal distance measuring section configured to measure an inter-terminal distance between the first terminal and the second terminal, and the inter-terminal distance is further used as the specific condition.

3. The control system according to claim 2, wherein at least one of the first executable instructions and the second executable instructions, when executed by at least one of the first processor and the second processor, cause at least one of the first terminal and the second terminal to further function as an operator detecting section configured to detect an operator operating the at least one terminal itself.

4. The control system according to claim 2, wherein the security process further includes a process of locking the moving terminal if the inter-terminal distance is not smaller than a predetermined value.

5. The control system according to claim 2, wherein the security process further includes a process of deleting shared data held by the second terminal and stopping a communication function of the first terminal if the moving terminal is the second terminal, and of locking the first terminal if the moving terminal is the first terminal, in a case where the inter-terminal distance is not smaller than a predetermined value.

6. The control system according to claim 3, wherein the security process further includes a process of locking the moving terminal if the operator of the moving terminal is not the specific user in a case where the inter-terminal distance is not smaller than a predetermined value.

7. The control system according to claim 3, wherein the security process further includes a process of deleting shared data held by the second terminal and stopping a communication function of the first terminal if the operator of the moving terminal is not the specific user, in a case where the inter-terminal distance is not smaller than a predetermined value.

8. The control system according to claim 1, wherein the second executable instructions, when executed by the second processor, cause the second terminal to further function as an operation detecting section configured to detect presence or absence of a terminal operation onto the second terminal itself performed by an operator, and the presence or absence of the terminal operation is further used as the specific condition.

9. The control system according to claim 8, wherein at least one of the first executable instructions and the second executable instructions, when executed by at least one of the first processor and the second processor, cause at least one of the first terminal and the second terminal to further function as an operator detecting section configured to detect an operator operating the at least one terminal itself.

10. The control system according to claim 8, wherein the security process further includes a process of locking the moving terminal in a case where the terminal operation is not performed for a certain time period.

11. The control system according to claim 8, wherein the security process further includes a process of deleting shared data held by the second terminal and stopping a communication function of the first terminal if the moving terminal is the second terminal, and of locking the first terminal if the moving terminal is the first terminal, in a case where the terminal operation is not performed for a certain time period.

12. The control system according to claim 9, wherein the security process further includes a process of locking the moving terminal if the operator of the moving terminal is not the specific user, in a case where the terminal operation is not performed for a certain time period.

13. The control system according to claim 9, wherein the security process further includes a process of deleting shared data held by the second terminal and stopping the communication function of the first terminal if the operator of the moving terminal is not the specific user, in a case where the terminal operation is not performed for a certain time period.

14. A wireless terminal included in a control system, the terminal comprising:
   a processor; and
   a non-transitory memory having stored thereon executable instructions, which when executed by the processor, cause the terminal to function as:
      a moving state detecting section configured to detect whether the terminal itself is in a moving state;
      a moving terminal determining section configured to determine whether a moving terminal that is currently moving is another terminal, the terminal, or both of the another terminal and the terminal, based on information, notified of by the another terminal, regarding whether the another terminal is in a moving state and a result detected by the moving state detecting section;
      a security process determining section configured to determine a terminal on which to perform a security process and a content of the security process, in accordance with a specific condition and the moving terminal determined by the moving terminal determining section; and
      a security process executing section configured to perform the security process determined by the security process determining section,
   wherein the specific condition is whether an operator is a specific user, and
   the security process includes a process of locking a not-moving terminal if an operator of the moving terminal is the specific user.

15. A security control method performed between a first terminal and a second terminal, the method comprising:
   the first terminal detecting whether the first terminal itself is in a moving state and notifying the second terminal of a result of the detection; and
   the second terminal
      detecting whether the second terminal itself is in a moving state;
      determining whether a moving terminal that is currently moving is the first terminal, the second terminal, or both of the first terminal and the second terminal, based on the result of the detection notified of by the first terminal and a result detected in the second terminal itself;
      determining whether an operator is a specific user;
      determining a terminal on which to perform a security process and a content of the security process, in accordance with the operator and the moving terminal that have been determined; and
      performing the determined security process; wherein
   in the security process, a not-moving terminal is locked if an operator of the moving terminal is the specific user.

* * * * *